(12) United States Patent
Zachar et al.

(10) Patent No.: US 9,514,204 B2
(45) Date of Patent: Dec. 6, 2016

(54) MOBILE DIGITAL PROPERTY PORTFOLIO MANAGEMENT SYSTEM

(75) Inventors: Ilan Zachar, Aventura, FL (US); Osvaldo Vazquez, Aventura, FL (US)

(73) Assignee: Gazit Group USA, Inc., Miami, FL (US)

( * ) Notice: Subject to any disclaimer, the term of this patent is extended or adjusted under 35 U.S.C. 154(b) by 489 days.

(21) Appl. No.: 13/296,910

(22) Filed: Nov. 15, 2011

(65) Prior Publication Data

US 2012/0124069 A1    May 17, 2012

Related U.S. Application Data

(60) Provisional application No. 61/414,400, filed on Nov. 16, 2010.

(51) Int. Cl.
  *G06F 7/00* (2006.01)
  *G06F 17/30* (2006.01)
  *G06Q 50/16* (2012.01)

(52) U.S. Cl.
  CPC ....... *G06F 17/30566* (2013.01); *G06Q 50/163* (2013.01)

(58) Field of Classification Search
  CPC .... G06F 17/30; G06F 17/30566; G06F 17/00; G06Q 40/00; G06Q 40/04; G06Q 30/02; G06Q 20/00; G06Q 50/188; G06Q 30/0283
  See application file for complete search history.

(56) References Cited

U.S. PATENT DOCUMENTS

| | | | |
|---|---|---|---|
| 6,226,650 B1 * | 5/2001 | Mahajan et al. | 707/625 |
| 7,668,773 B1 | 2/2010 | Pruitt | |
| 7,739,183 B2 | 6/2010 | Voudrie | |
| 7,805,462 B2 | 9/2010 | Dupont et al. | |
| 2003/0014402 A1 | 1/2003 | Sealand et al. | |
| 2005/0080702 A1 | 4/2005 | Modi | |
| 2005/0114248 A1 | 5/2005 | Dupont et al. | |

(Continued)

FOREIGN PATENT DOCUMENTS

KR    10-0629145 B1    9/2006

OTHER PUBLICATIONS

Hinds et al. (WO 2005/101238).*

*Primary Examiner* — Azam Cheema
(74) *Attorney, Agent, or Firm* — Zaretsky Group PC; Howard Zaretsky

(57) ABSTRACT

A mobile property portfolio management system provides the capability of generating, maintaining, searching and displaying property portfolio data from a mobile device such as a smartphone (e.g., iPhone), tablet (e.g., iPad) or any other mobile computing device. The property portfolio management system comprises a mobile or client portion, a central or server portion and optional satellite offices. The system comprises software that runs on one or more server computers as well as client or user side software that can be realized as a standalone software application or "app" that runs on the client device (e.g., desktop, mobile device, tablet, etc.) or entirely in a standard web browser. The property portfolio management system in effect provides a digital version of a property portfolio with easy access to portfolio data for both internal users and public users and is particularly useful when realized on a tablet or mobile device.

27 Claims, 24 Drawing Sheets

(56) References Cited

U.S. PATENT DOCUMENTS

| | | |
|---|---|---|
| 2005/0187851 A1 | 8/2005 | Sant |
| 2005/0273409 A1 | 12/2005 | Voudrie |
| 2006/0206400 A1 | 9/2006 | Usui |
| 2008/0120302 A1* | 5/2008 | Thompson et al. .............. 707/9 |
| 2008/0294569 A1 | 11/2008 | Dever |
| 2009/0144097 A1 | 6/2009 | Fassio et al. |
| 2009/0282169 A1 | 11/2009 | Kumar et al. |
| 2011/0225127 A1 | 9/2011 | Abar et al. |
| 2011/0231294 A1 | 9/2011 | McClelland |

* cited by examiner

| USER INFO | ADD NEW | SAVE |

171 — USER TYPE  ○ AD USER  ● WEB USER
172 — USER NAME  [                    ]
174 — PASSWORD  [                    ]  ← 170
176 — REAL NAME  [                    ]
178 — EMAIL  [                    ]
180 — APPLICATION  [SELECT APPLICATION ▽]
182 — ROLE  [SELECT ROLE ▽]

FIG.14

ROLE INFO

NAME: ROL TEST
DESCRIPTION:
APPLICATION: DP.SEC

| OBJECTS | ACTION | DISCRIPTION | ALLOW |
|---|---|---|---|
| Process | SynchronizationDB | THIS REPRENTS SYNCHRONIZATION DATABASE | ☐ |
| ReportsSecurity | ViewListSecurityByApplication | THIS REPRENTS VIEWING REPORT FOR DB.SEC | ☐ |
| ReportsSecurity | ViewTotalUserByRole | THIS REPRENTS VIEWING REPORT FOR DB.SEC | ☐ |
| Roles | CreateRole | THIS REPRENTS CREATING A ROLE | ☐ |
| Roles | DeleteRole | THIS REPRENTS DELETING A ROLE | ☐ |
| Roles | ViewRole | THIS REPRENTS VIEWING ROLE | ☐ |
| Roles | UpdateRole | THIS REPRENTS UPDATING A ROLE | ☐ |
| Users | DeleteUser | THIS REPRENTS DELETING A USER | ☐ |
| Users | UpdateUser | THIS REPRENTS UPDATING A USER | ☐ |
| Users | ViewUser | THIS REPRENTS VIEWING A USER | ☐ |
| Users | UpdateADGroups | THIS REPRENTS UPDATING AD GROUPS | ☐ |
| Users | UpdateADCredentials | THIS REPRENTS UPDATING A LOGIN FOR AD | ☐ |
| Users | CreateUser | THIS REPRENTS CREATING A USER | ☐ |

ADD NEW   SAVE

PROPERTY INFO                                         [ADD NEW]  [SAVE]

*191*

| INFO | MISCELLANEOUS | FLOOR | FILES | STATISTICS | DEMOGRAPHICS | TENANT |

- 192 — NAME: [_____] REQUIRED FIELD!
- 194 — NUMBER: [_____] REQUIRED FIELD!
- 196 — LEGAL NAME: [_____]
- 198 — TRADE NAME: [_____]
- 200 — ADDRESS: [_____]
- 202 — AREA CODE: [_____]
- 204 — CITY: [_____] 🔍 ✕ REQUIRED FIELD!
- 206 — CONTACT: [_____] 🔍 ✕
- 208 — PROSPECTIVE: [_____] 🔍 ✕
- 210 — PORTFOLIO: [SELECT PORTFOLIO ▼] PLEASE SELECT A PORTFOLIO OR PROSPECTIVE OPTION
- 212 — STATUS: [SELECT STATUS ▼] REQUIRED FIELD!
- 214 — TYPE: [SELECT TYPE ▼] REQUIRED FIELD!
- 216 — DESCRIPTION: [_____]
- 218 — UPDATE: [_____]
- 220 — LATITUDE: [_____]
- 222 — LONGITUDE: [_____]
- 224 — LAST UPDATE: [_____]
- 226 — UPLOAD SWF FILE: [_____] [BROWSE]
- 227 — SITEPLAN SWF: [_____] ✕
- 228 — WEB PAGES:
    - 229 — NAME: [_____] [ADD NEW] [UPDATE]

MOBILE DIGITAL PROPERTY PORTFOLIO MANAGEMENT SYSTEM

REFERENCE TO PRIORITY APPLICATION

This application claims priority to U.S. Provisional Application Ser. No. 61/414,400, filed Nov. 16, 2010, entitled "Mobile Digital Property Portfolio Viewer," incorporated herein by reference in its entirety.

FIELD OF THE INVENTION

The present invention relates to the field of database systems, and more particularly relates to a mobile digital property portfolio system.

SUMMARY OF THE INVENTION

There is therefore provided in accordance with the present invention, a property portfolio system, comprising a central database operative to store real estate portfolio related data therein, and a server computer in communication with one or more client computers over a network, said server computer incorporating a web-based interface and operative to access said central database in response to requests for real estate portfolio related data received from users over a network, retrieve said real estate portfolio related data from said central database and serve said retrieved real estate portfolio data to said users.

There is also provided in accordance with the present invention, a method of managing a property portfolio, said method comprising receiving a request from a user over a network for property portfolio related information, said property portfolio generated from user entered property portfolio related data and stored in a central database, in response to said request, retrieving data corresponding to said request for information about one or more properties from said central database, and serving said requested data to said user over said network.

There is further provided in accordance with the present invention, a method of viewing a property portfolio on a mobile device, said method comprising providing an application on said mobile device for dynamic, interactive viewing and management of an electronic real estate property portfolio, said electronic property portfolio generated from property portfolio data entered by a user and stored in a database, in response to a user command to view property portfolio data, retrieving property portfolio data from said database, and formatting and displaying property portfolio data corresponding to said user command to said user.

There is also provided in accordance with the present invention, a software application product that when executed on a processor in a mobile device is operative to provide dynamic, interactive viewing and management of an electronic real estate property portfolio, said electronic real estate property portfolio generated from property related data stored in a database, in response to a user request for data, send a request to said database for real estate property portfolio data corresponding to said user requests, receive from said server, in response to said request, a response containing requested real estate property portfolio data, and format and display said real estate property portfolio data received in said response to said user.

There is further provided in accordance with the present invention, a computer program product for viewing an electronic property portfolio, the computer program product comprising a non-transitory computer usable storage medium having computer usable code embodied therewith, the computer usable program code comprising computer usable code configured for receiving a request from a user over a network for information about one or more properties in said property portfolio, said property portfolio generated from user entered property portfolio related data and stored in a central database, computer usable code configured for in response to said request, retrieving data corresponding to said request for information about one or more properties from said central database, and computer usable code configured for serving said requested data to said user over said network.

There is also provided in accordance with the present invention, a property portfolio management system for use on a mobile device, comprising a data interface for retrieving real estate portfolio data from a database adapted to store real estate portfolio data, and a software application for execution on said mobile device by users, said application operative to provide dynamic, interactive viewing and management of real estate portfolio data stored in said database.

BRIEF DESCRIPTION OF THE DRAWINGS

The invention is herein described, by way of example only, with reference to the accompanying drawings, wherein:

FIG. 14 is a diagram illustrating an example user information page of an example portfolio management system;

FIG. 15 is a diagram illustrating an example role information page of an example portfolio management system;

FIG. 16 is a diagram illustrating an example tenant information page of an example portfolio management system;

FIG. 17 is a diagram illustrating an example property information page of an example portfolio management system;

DETAILED DESCRIPTION OF THE INVENTION

Figure 1:
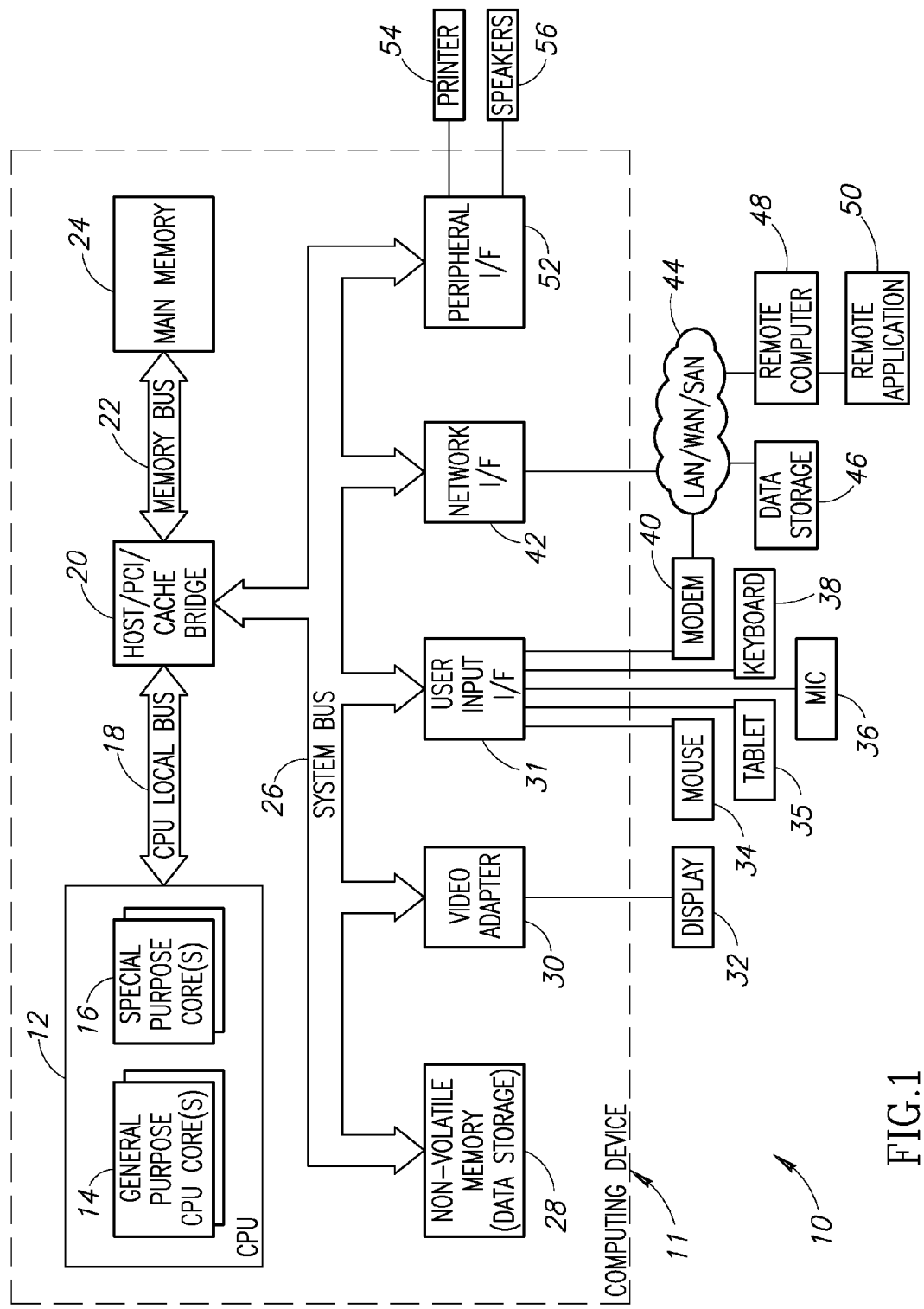
FIG. 1 is a block diagram illustrating an example computer processing system adapted to implement the portfolio management system of the present invention.

Note that throughout this document the term "website" is used to refer to a user-accessible network site that implements the basic World Wide Web standards for the coding and transmission of hypertext documents. These standards currently include HTML (the hypertext mark up language) and HTTP (the hypertext transfer protocol). Note that the term "site" is not intended to imply a single geographic location as a website or other network site can, for example, include multiple geographically distributed computer systems that are appropriately linked together.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The invention is operational with numerous general purpose or special purpose computing system environments or configurations. Examples of well-known computing systems, environments, and/or configurations that may be suitable for use with the invention include, but are not limited to, personal computers, server computers, cloud computing, hand-held or laptop devices, multiprocessor systems, microprocessor, microcontroller or microcomputer based systems, set top boxes, programmable consumer electronics, ASIC or FPGA core, DSP core, network PCs, minicomputers, mainframe computers, distributed computing environments that include any of the above systems or devices, and the like.

A block diagram illustrating an example computer processing system adapted to implement the mobile property portfolio system of the present invention is shown in FIG. 1. The exemplary computer processing system, generally referenced 10, for implementing the invention comprises a general purpose computing device 11. Computing device 11 comprises central processing unit (CPU) 12, host/PIC/cache bridge 20 and main memory 24.

The CPU 12 comprises one or more general purpose CPU cores 14 and optionally one or more special purpose cores 16 (e.g., DSP core, floating point, etc.). The one or more general purpose cores execute general purpose opcodes while the special purpose cores executes functions specific to their purpose. The CPU 12 is coupled through the CPU local bus 18 to a host/PCI/cache bridge or chipset 20. A second level (i.e. L2) cache memory (not shown) may be coupled to a cache controller in the chipset. For some processors, the external cache may comprise an L1 or first level cache. The bridge or chipset 20 couples to main memory 24 via memory bus 20. The main memory comprises dynamic random access memory (DRAM) or extended data out (EDO) memory, or other types of memory such as ROM, static RAM, flash, and non-volatile static random access memory (NVSRAM), bubble memory, etc.

The computing device 11 also comprises various system components coupled to the CPU via system bus 26 (e.g., PCI). The host/PCI/cache bridge or chipset 20 interfaces to the system bus 26, such as peripheral component interconnect (PCI) bus. The system bus 26 may comprise any of several types of well-known bus structures using any of a variety of bus architectures. Example architectures include Industry Standard Architecture (ISA) bus, Micro Channel Architecture (MCA) bus, Enhanced ISA (EISA) bus, Video Electronics Standards Associate (VESA) local bus and Peripheral Component Interconnect (PCI) also known as Mezzanine bus.

Various components connected to the system bus include, but are not limited to, non-volatile memory (e.g., disk based data storage) 28, video/graphics adapter 30 connected to display 32, user input interface (I/F) controller 31 connected to one or more input devices such mouse 34, tablet 35, microphone 36, keyboard 38 and modem 40, network interface controller 42, peripheral interface controller 52 connected to one or more external peripherals such as printer 54 and speakers 56. The network interface controller 42 is coupled to one or more devices, such as data storage 46, remote computer 48 running one or more remote applications 50, via a network 44 which may comprise the Internet cloud, a local area network (LAN), wide area network (WAN), storage area network (SAN), etc. A small computer systems interface (SCSI) adapter (not shown) may also be coupled to the system bus. The SCSI adapter can couple to various SCSI devices such as a CD-ROM drive, tape drive, etc.

The non-volatile memory 28 may include various removable/non-removable, volatile/nonvolatile computer storage media, such as hard disk drives that reads from or writes to non-removable, nonvolatile magnetic media, a magnetic disk drive that reads from or writes to a removable, non-volatile magnetic disk, an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

A user may enter commands and information into the computer through input devices connected to the user input interface 31. Examples of input devices include a keyboard and pointing device, mouse, trackball or touch pad. Other input devices may include a microphone, joystick, game pad, satellite dish, scanner, etc.

The computer 11 may operate in a networked environment via connections to one or more remote computers, such as a remote computer 48. The remote computer may comprise a personal computer (PC), server, router, network PC, peer device or other common network node, and typically includes many or all of the elements described supra. Such networking environments are commonplace in offices, enterprise-wide computer networks, intranets and the Internet.

When used in a LAN networking environment, the computer 11 is connected to the LAN 44 via network interface 42. When used in a WAN networking environment, the computer 11 includes a modem 40 or other means for establishing communications over the WAN, such as the Internet. The modem 40, which may be internal or external, is connected to the system bus 26 via user input interface 31, or other appropriate mechanism.

The computing system environment, generally referenced 10, is an example of a suitable computing environment and is not intended to suggest any limitation as to the scope of use or functionality of the invention. Neither should the computing environment be interpreted as having any dependency or requirement relating to any one or combination of components illustrated in the exemplary operating environment.

In one embodiment, the software adapted to implement the system and methods of the present invention can also reside in the cloud. Cloud computing provides computation, software, data access and storage services that do not require end-user knowledge of the physical location and configuration of the system that delivers the services. Cloud computing encompasses any subscription-based or pay-per-use service and typically involves provisioning of dynamically scalable and often virtualized resources. Cloud computing providers deliver applications via the internet, which can be accessed from a web browser, while the business software and data are stored on servers at a remote location.

In another embodiment, software adapted to implement the system and methods of the present invention is adapted to reside on a computer readable medium. Computer readable media can be any available media that can be accessed by the computer and capable of storing for later reading by a computer a computer program implementing the method of this invention. Computer readable media includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data such as a magnetic disk within a disk drive unit. The software adapted to implement the system and methods of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the system and methods of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk, CDROM, DVD, flash memory, portable hard disk drive, etc. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Figure 2:
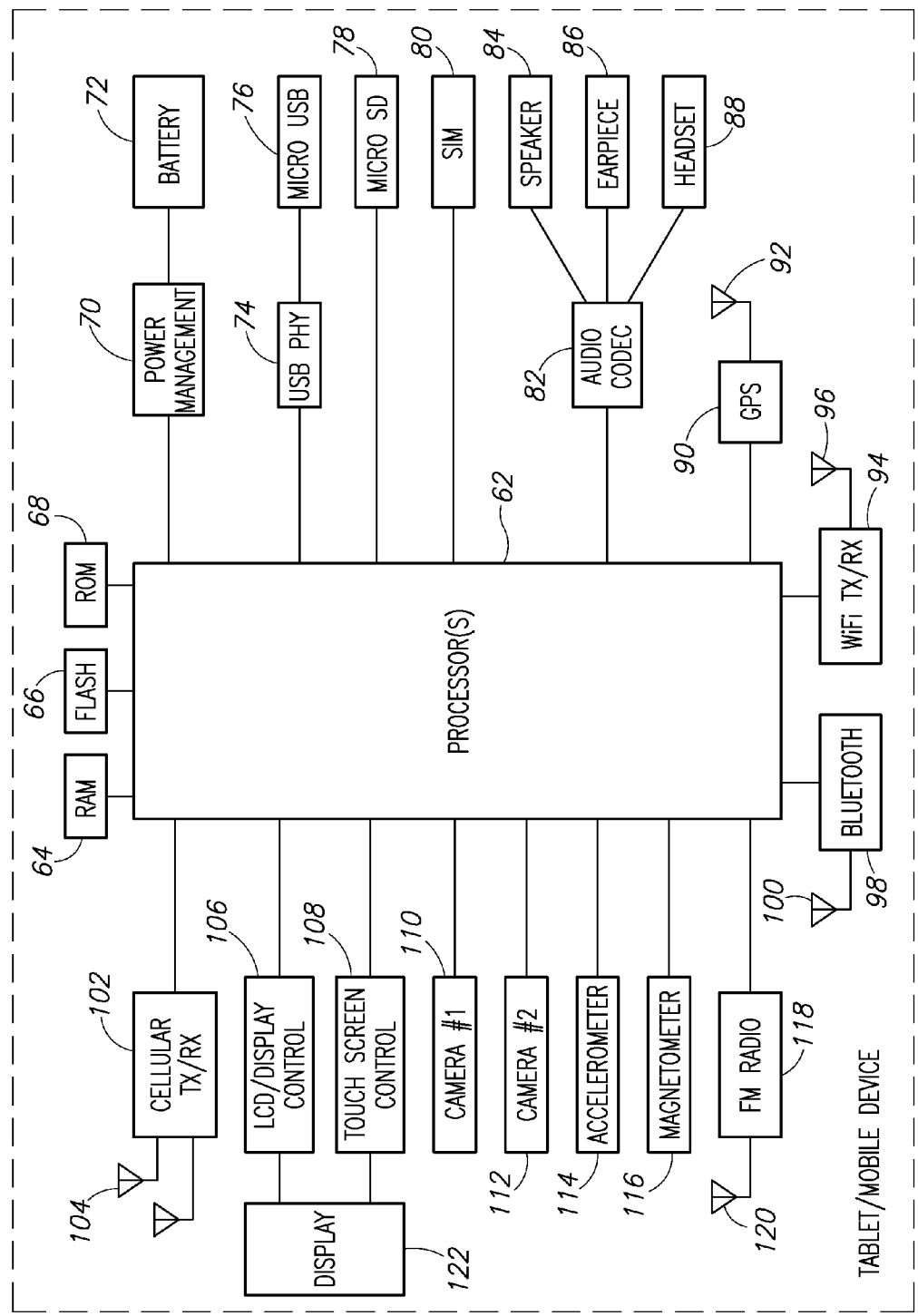
FIG. 2 is a high level block diagram illustrating an example tablet/mobile device incorporating the portfolio management system of the present invention.

Tablet/Mobile Device Incorporating the Mobile Digital Portfolio Management Application A high level block diagram illustrating an example tablet/mobile device incorporating the mobile property portfolio management system of the present invention is shown in FIG. 2. The mobile device is preferably a two-way communication device having voice and/or data communication capabilities. In addition, the device optionally has the capability to communicate with other computer systems via the Internet. Note that the mobile device may comprise any suitable wired or wireless device such as multimedia player, mobile communication device, cellular phone, smartphone, PDA, PNA, Bluetooth device, tablet computing device such as the iPad, etc. For illustration purposes only, the device is shown as a mobile device, such as a cellular based telephone, smartphone or superphone. Note that this example is not intended to limit the scope of the mechanism as the invention can be implemented in a wide variety of communication devices. It is further appreciated the mobile device shown is intentionally simplified to illustrate only certain components, as the mobile device may comprise other components and subsystems beyond those shown.

The mobile device, generally referenced 60, comprises one or more processors 62 which may comprise a baseband processor, CPU, microprocessor, DSP, etc., optionally having both analog and digital portions. The mobile device may comprise a plurality of cellular radios 102 and associated antennas 104. Radios for the basic cellular link and any number of other wireless standards and Radio Access Technologies (RATs) may be included. Examples include, but are not limited to any 3G or 4G cellular standard, Long Term Evolution (LTE), Code Division Multiple Access (CDMA), Personal Communication Services (PCS), Global System for Mobile Communication (GSM)/GPRS/EDGE 3G; WCDMA; WiMAX for providing WiMAX wireless connectivity when within the range of a WiMAX wireless network; Bluetooth for providing Bluetooth wireless connectivity when within the range of a Bluetooth wireless network; WLAN for providing wireless connectivity when in a hot spot or within the range of an ad hoc, infrastructure or mesh based wireless LAN (WLAN) network; near field communications; UWB; GPS receiver for receiving GPS radio signals transmitted from one or more orbiting GPS satellites, FM transceiver provides the user the ability to listen to FM broadcasts as well as the ability to transmit audio over an unused FM station at low power, such as for playback over a car or home stereo system having an FM receiver, digital broadcast television, etc.

The mobile device may also comprise internal volatile storage 64 (e.g., RAM) and persistent storage 68 (e.g., ROM) and flash memory 66. Persistent storage 68 also stores applications executable by processor(s) 62 including the related data files used by those applications to allow device 60 to perform its intended functions. Several optional user-interface devices include trackball/thumbwheel which may comprise a depressible thumbwheel/trackball that is used for navigation, selection of menu choices and confirmation of action, keypad/keyboard such as arranged in QWERTY fashion for entering alphanumeric data and a numeric keypad for entering dialing digits and for other controls and inputs (the keyboard may also contain symbol, function and command keys such as a phone send/end key, a menu key and an escape key), headset 88, earpiece 86 and/or speaker 84, microphone(s) and associated audio codec or other multimedia codecs, vibrator for alerting a user, one or more cameras and related circuitry 110, 112, display(s) 122 and associated display controller 106 and touchscreen control 108. Serial ports include a micro USB port 76 and related USB PHY 74 and micro SD port 78. Other interface connections may include SPI, SDIO, PCI, USD, etc. for providing a serial link to a user's PC or other device. SIM/RUIM card 80 provides the interface to a user's SIM or RUIM card for storing user data such as address book entries, user identification, etc.

Portable power is provided by the battery 72 coupled to power management circuitry 70. External power is provided via USB power or an AC/DC adapter connected to the power management circuitry which is operative to manage the charging and discharging of the battery. In addition to a battery and AC/DC external power source, additional optional power sources each with its own power limitations, include: a speaker phone, DC/DC power source, and any bus powered power source (e.g., USB device in bus powered mode).

Operating system software executed by the processor 62 is preferably stored in persistent storage (i.e. ROM 68), or flash memory 66, but may be stored in other types of memory devices. In addition, system software, specific device applications, or parts thereof, may be temporarily loaded into volatile storage 64, such as random access memory (RAM). Communications signals received by the mobile device may also be stored in the RAM.

The processor 62, in addition to its operating system functions, enables execution of software applications on the device 60. A predetermined set of applications that control basic device operations, such as data and voice communications, may be installed during manufacture. Additional applications (or apps) may be downloaded from the Internet and installed in memory for execution on the processor. Alternatively, software may be downloaded via any other suitable protocol, such as SDIO, USB, network server, etc.

Other components of the mobile device include an accelerometer 114 for detecting motion and orientation of the device, magnetometer 116 for detecting the earth's magnetic field, FM radio 118 and antenna 120, Bluetooth radio 98 and antenna 100, Wi-Fi radio 94 including antenna 96 and GPS 90 and antenna 92.

In accordance with the invention, the mobile device 60 is adapted to implement the mobile property portfolio system as hardware, software or as a combination of hardware and software. In one embodiment, implemented as a software task, the program code operative to implement the mobile property portfolio system is executed as one or more tasks running on processor 62 and either (1) stored in one or more memories 64, 66, 68 or (2) stored in local memory within the processor 62 itself.

Mobile Digital Property Portfolio Management System

Figure 3:
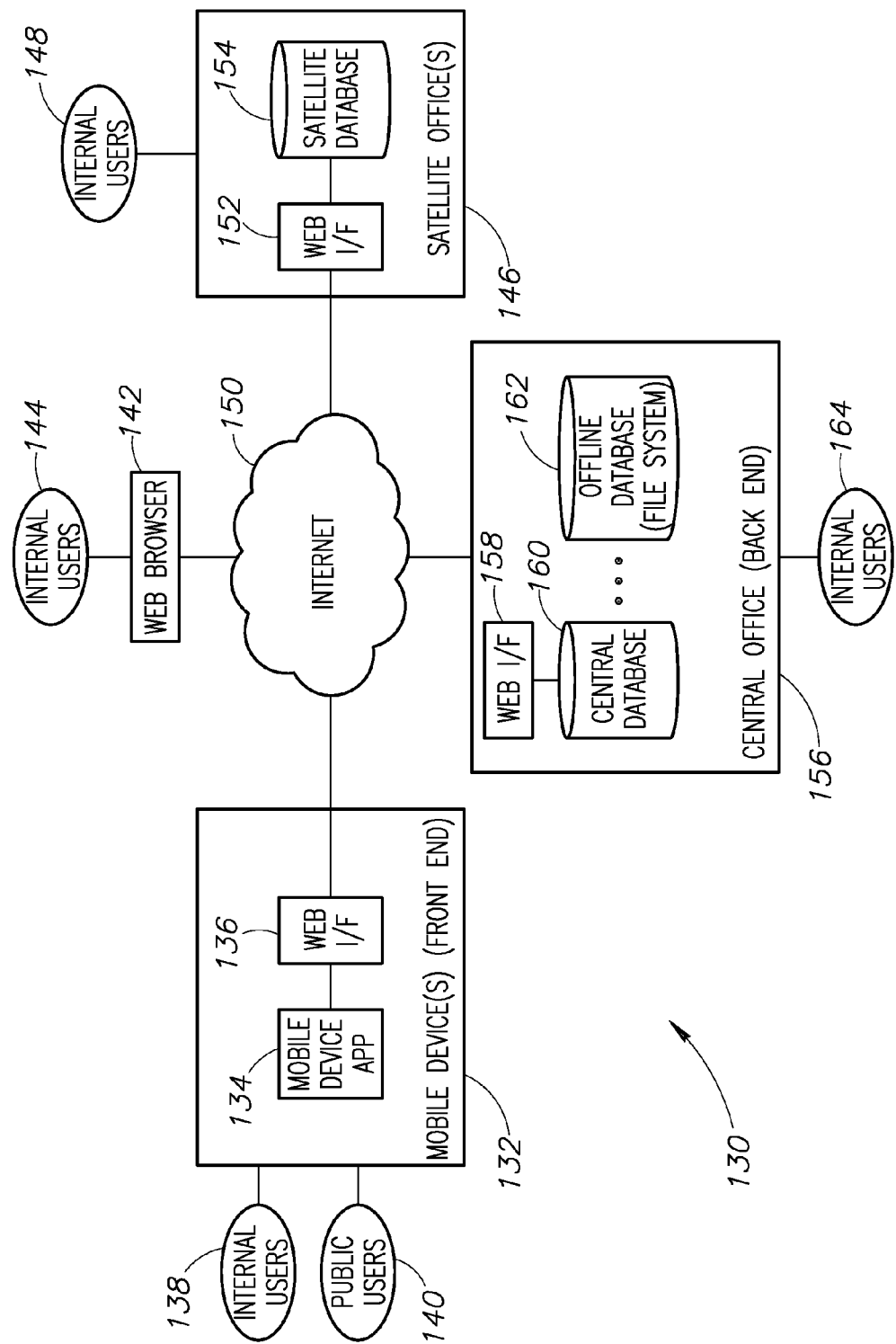
FIG. 3 is a block diagram illustrating an example network that includes a mobile device, central and satellite offices, internal and public users.

A block diagram illustrating an example network that includes a mobile device, central and satellite offices, internal and public users is shown in FIG. 3. The network, generally referenced 130, comprises a central office (back-end) 156 connected to the internet 150 or other network (e.g., WAN, etc.), one or more satellite offices 146 and one or more mobile devices (front-end) 132 connected to the internet as well.

The central office 156 comprises a central database 160 connected to the internet via a web interface 158. Offline databases 162 are generated by the central office and are used by mobile device users when there is no connectivity from the mobile device to the central office or when the central office is down. Offline databases are essentially clones of the central database. A copy of the offline database is sent to the mobile device and stored therein to provide portfolio data for internal and public users with there is no connectivity to the central office. Internal users 164 have access to the contents of the central database and can add, delete and change data stored therein.

One or more satellite offices 146 can be located anywhere and are connected to the internet. Internal users 148 connect to the satellite office via a web interface 152 or direct connection. The satellite office comprises a satellite database 154. The satellite database in each satellite office is periodically synchronized with the central database in the central office. The changed contents of the satellite databases are merged with the contents of the central database using well-known database synchronization techniques.

Internal users 144 also connect to the central office or a satellite office via a web browser 142 interface connected to the internet. Internal users mainly perform administrative tasks such as maintaining the property portfolio information, user related information, etc. on the satellite and/or central databases.

The back end comprises a website that a user can log into from within the corporate network and search, list, view, upload, change or delete data. In order to control the management of the content the back end website comprises two sections. The first section is a user management console (admin tools/security tools) where the different users (internal users) are granted access and can see and modify content in accordance with their configured role or permissions. The second section is where the data and content are maintained.

Note that the application of the invention is operative to provide an interactive environment on mobile (portable) devices on the different real estate portfolios that a company may have worldwide. The application also provides the option to view information related to properties not owned by a company (prospective properties not owned) and analyzes the information within the same graphical interface.

The application currently is split between the back end where all the data gets inputted and the front end, which currently is the iPad, iPhone or iPod Touch but it is not limited to these devices only.

The mobile property portfolio management system provides the capability of generating, maintaining, searching and displaying property portfolio data from a mobile device such as a smartphone (e.g., iPhone), tablet (e.g., iPad) or any other mobile computing device. The system is intended for use on any computer system such as desktop computers, laptop computers, notebook computers, netbook computers, wireless mobile devices, mobile phones, etc. It is however, especially applicable for use on tablet computers such as the Apple iPad, Android based tablets and other tablet formats.

The property portfolio system comprises a mobile or client portion 132 and a central or server portion 156 (and zero or more optional satellite offices 146). The system comprises software that runs on one or more server computers as well as client or user side software that can be realized (1) as a standalone software application or "app" that runs on the client device (e.g., desktop, mobile device, tablet, etc.) or (2) entirely in a standard web browser. Essentially, the property portfolio system provides a digital version of a property portfolio with easy access to portfolio data for both internal users and public users and is particularly useful when realized on a tablet or mobile device.

The property portfolio management application of the invention project can be implemented at relatively low cost for mobile devices. A product incorporating the invention can accompany existing company real estate portfolios. It is appreciated that although the invention is described in the context of an example property portfolio system, it is not limited to such and can be used with portfolios containing items other than real estate.

The property portfolio system stores company property portfolios and displays the information to directors and investors (public users) via the mobile application (app). The web user interface (UI) functionality performs actions on the satellite or central database such as Add/Update/Delete information portfolios (e.g., images, site plan, property information, financial analysis, competitive analysis, demographic, statistics, regional office, leasing agent, units, tenant-broker, tenant, prospective owner (i.e. not an owner yet).

Figure 4:
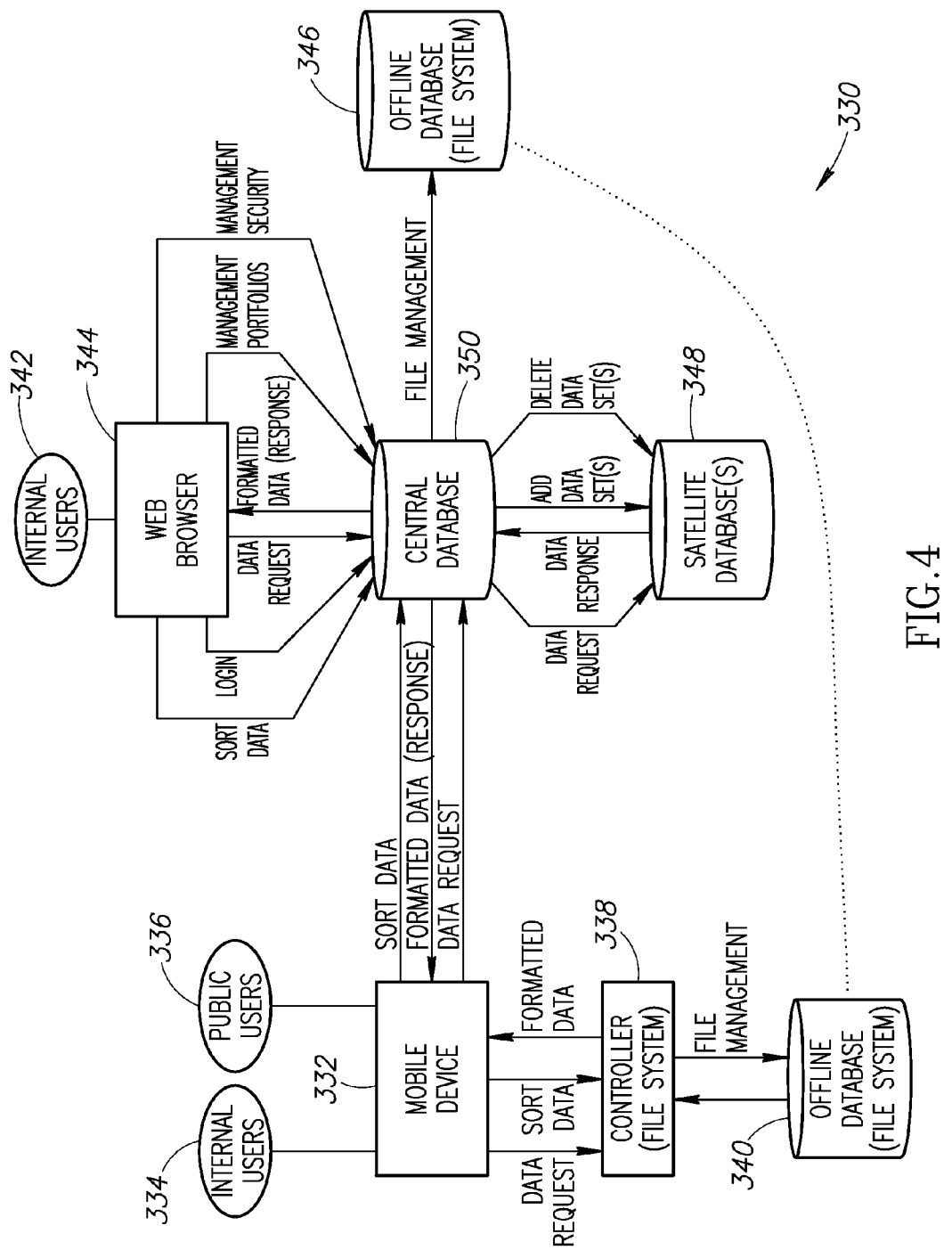
FIG. 4 is a block diagram illustrating an example of the data flow in an example portfolio management system.

A block diagram illustrating an example of the data flow in an example portfolio management system is shown in FIG. 4. The network, generally referenced 330, comprises a central database 350 (located in the central office) adapted to store company wide portfolio data thereon, optional satellite database(s) 348 and offline database(s) 346. Internal users 342 have authority to access and modify the central database via web browser interface 344. Internal users can access and modify sort data, login data, request data, formatted data (responses), management portfolios (including prospective property data (not owned) and management security data.

The mobile device 332 provides access to the central database (and offline database when it cannot connect to the central database or when the central database is not up and running) for both internal users 334 and public users 336. As described supra, internal users have additional privileges to manage the portfolio data stored on the central database. The mobile device is operative to exchange sort data, formatted data (responses) and data requests between itself and the central database. If the device cannot connect to the central database, it attempts to connect to an offline database 340 (an offline version of the central database). An offline database may or may not be stored on the device. If the device finds an offline database, it exchanges data requests, formatted data responses and sort data with it via controller (file system) 338.

Satellite database(s) 348, located in satellite offices, also exchange data with the central database. Typically, the satellite databases operate independently from the central database with internal users adding/changing/deleting records. Periodically (i.e. once a week, month, etc.), all or a portion of the satellite databases are synchronized with the central database. The synchronization can be performed online or offline and is not critical to the invention. For example, copies of the satellite database may be sent to the central office where datasets are added and deleted or modified in the central database based on the contents of the satellite database. Thus, after all satellite databases are synchronized, the central database contains a master version of all company data (i.e. an up to date version of portfolio data company wide). An updated offline database may then be generated for loading into the mobile devices for use when access to the central database is not possible.

Figure 5:
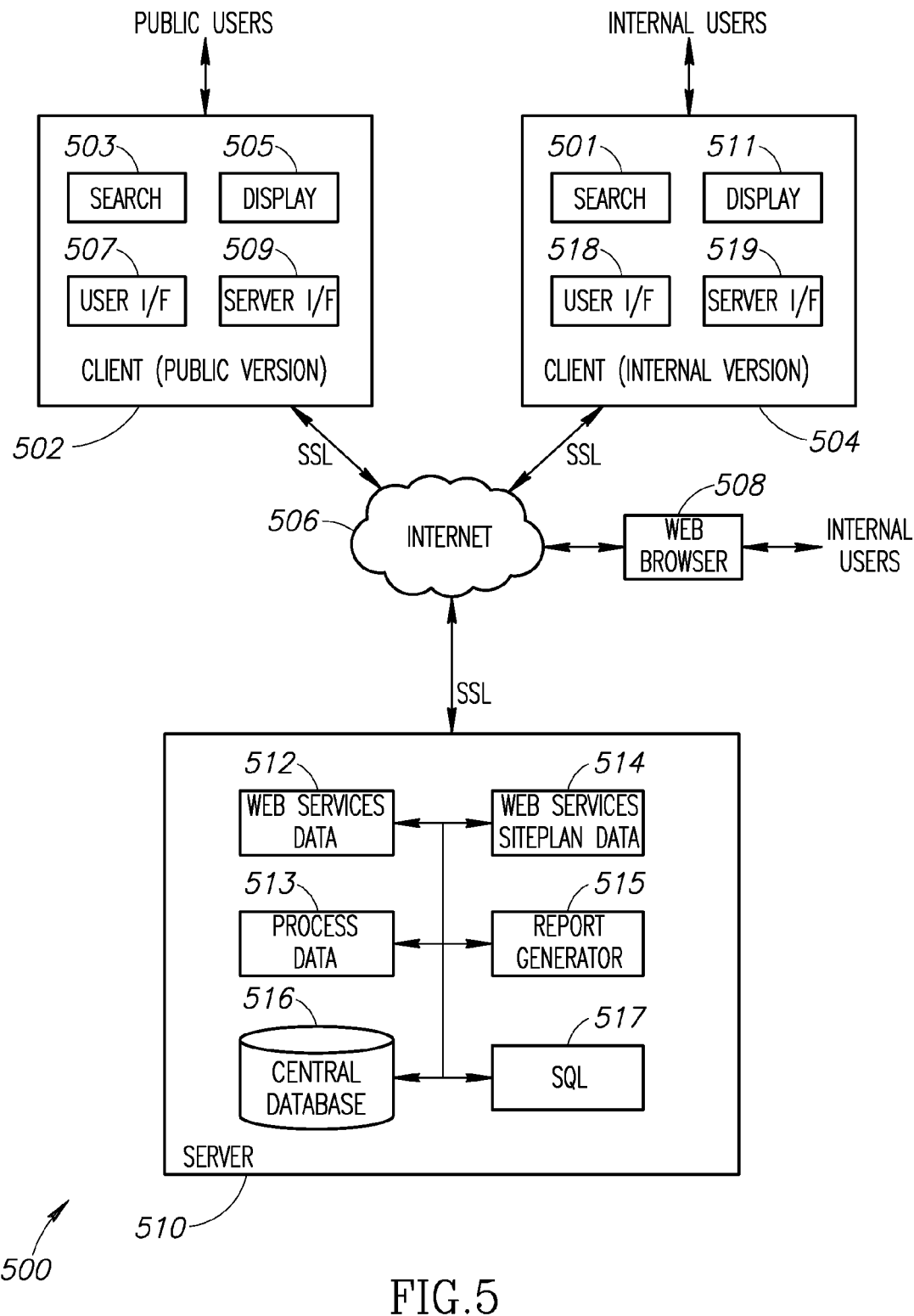
FIG. 5 is a block diagram illustrating the client and server tasks and related connectivity of the portfolio management system.

A block diagram illustrating the client and server tasks and related connectivity of the portfolio management system is shown in FIG. 5. The system, generally referenced 500, comprises public version clients 502 and internal version clients 504 in communication with a server 510 via the internet 506 or other wide band network. In addition, internal users can access the server via a web browser interface 508.

In an example embodiment, the server is implemented using an operating system platform such as Windows, Linux, Sun OS, etc. The server 510 may be implemented using any suitable computing device. In operation, it runs various tasks, subsystems and databases, including but not limited to, IIS, FTP, SQL, etc. The server 510 comprises an operating system (iOS in the case of the iPad, iPhone) and several tasks including web services data task 512, web services site plan data task 514, process data task 513, report generator task 515, SQL database management task 517 and the central database 516. In one embodiment, additional server tasks include ABM City, ABM Region, ABM State, ABM Country, ABM Prospective, ABM Portfolio, ABM Property Status, ABM Property Type, ABM Regional Office, ABM Leasing Agent, ABM Company, ABM Contact, ABM Tenant, ABM Tenant Category, ABM Tenant Config Global, ABM Unit, Process FootFall, Process Create SitePlan, Process Rent Roll, Generate Brochure and Generate Reports.

The public version client 502 for connecting public users to the server comprises an operating system (not shown), search task 503, display task 505, user interface task 507 and server interface task 509. In one embodiment, additional tasks on the public version client include Search Properties by Filters, Property location in Google Maps, View Property Information, View PDF Document on the property, View Images on the property, View FootFall information, View SitePlan map on the property and Comparison of Portfolios between non-owned Prospective properties.

The internal version client 504 for connecting internal users to the server comprises an operating system (not shown), search task 501, display task 511, user interface task 518 and server interface task 519. In one embodiment, the server, clients and web browser users all communicate over the internet using a secure protocol such as SSL. In one embodiment, additional tasks on the internal version client include Search Properties by Filters, Property location in Google Maps, View Property Information, View PDF Document on the property, View Images on the property, View FootFall information, View SitePlan map on the property, View Rent Roll information and Comparison of Portfolios between non-owned Prospective properties.

In one embodiment, the property portfolio system permits viewing and interacting with portfolios over mobile devices via the Internet. Users can display and interact with multiple company portfolios in different countries with a mobile device over the internet and/or via Web UI. Actions possible on the data include but are not limited to add, update, delete; information portfolio (data and images); site plan data; property information; financial data analysis; competitive (comparative) analysis; demographic data; statistics; regional office related data; leasing agent; units; tenant-broker data; tenant data; and prospective data (i.e. property not yet owned).

The system comprises software (i.e. application or app) operative to be executed on mobile devices such as Apple Inc. products such as the iPad, iPhone and iPod touch. It is appreciated that the system of the invention can be implemented on other mobile devices as well without departing from the scope of the invention.

An advantage of the property portfolio system of the invention is the accurate view and interactivity provided mobile device equipped users. Users have access over the internet to all company portfolios wherever they may actually be located. The portfolio data itself is stored in satellite databases which are periodically synchronized with a central repository database located in the company's server in the central office.

It is appreciated that a mobile app implementation based on the invention can be ported to a mobile device. Users can enter data from the mobile device, via the web, via a satellite office (after a synchronization event) or via a central office. Once the information is entered (add, modify, delete), it is updated in the backend utility (i.e. central database) resulting in users receiving updated information in real time.

In one embodiment, the app running on the user device is adapted to be especially usable as the typical user contemplated is not likely to have much training. In addition, the app is adapted to be customizable for use by various types of users, e.g., directors, investors, database maintenance personnel, company officers, etc. who need access to the company portfolios. Further, the app is adapted to display the target property portfolio data in one portfolio or different subsidiary portfolios.

The interface can be implemented on a mobile SDK platform for different mobile technologies (iPad, Android, etc.). Internal users have more access than public users as the former are responsible for creating and making changes to the contents of the central database.

In one embodiment, the Xcode suite of developer tools for the Apple Mac OSX operating system was used to create the system. This suite of tools comprises graphical user interface (GUI) based applications, command-line tools, and documentation to aid in the software development process. The Xcode application provides a powerful user interface for creating and managing software development projects. Xcode can be used to organize and edit source files, view documentation, build the application, debug the code, and optimize application performance.

In one embodiment, the app can be written using well-known Object Oriented Principles (OOP). The trade-off of increased code overhead and object message passing is considered justified by the increased modularization of functionality, data encapsulation, communication through interfaces and re-use through polymorphism.

The mobile framework (app) provides the core infrastructure for managing and running the application under different types of mobile devices (e.g., iOS, Android, etc.). Customization of the app is easily done through interactions with the classes of this framework.

Figure 6:
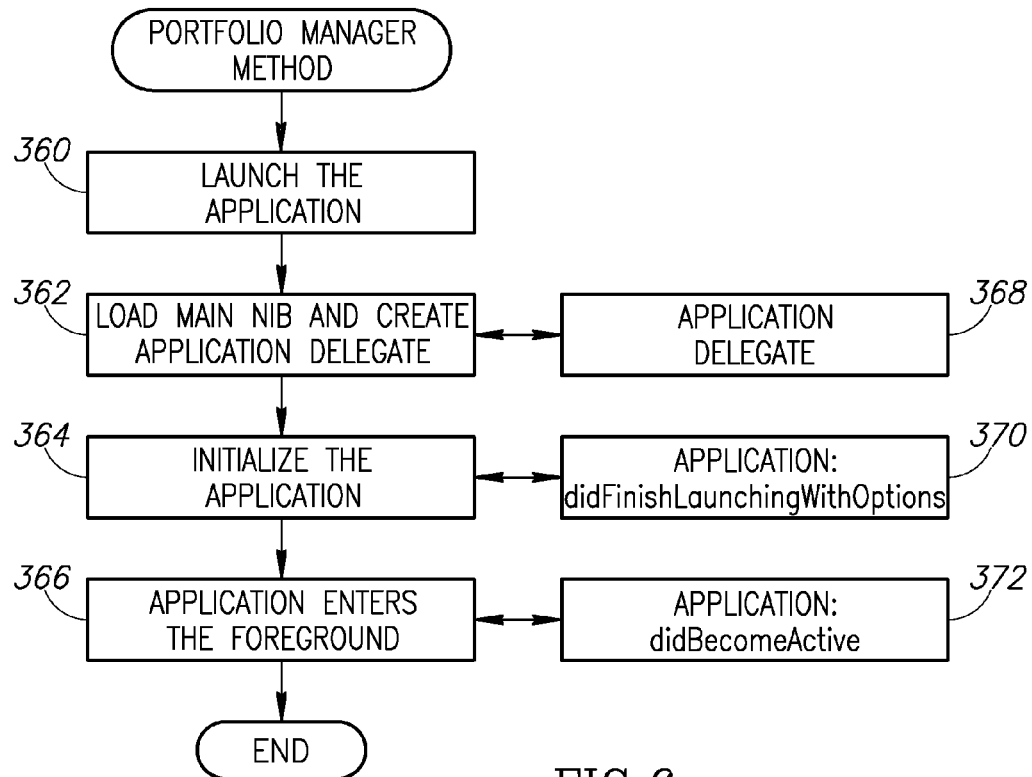
FIG. 6 is a flow diagram illustrating an example portfolio manager method of the portfolio management system.

A flow diagram illustrating an example portfolio manager method of the portfolio management system is shown in FIG. 6. After launching the application (step 360), the main nib is loaded and the application delegate 368 is created (step 362). The application data structures are then initialized (step 364) (block 370) and the application enters the foreground (step 366) (block 372). All manipulations to windows occur through the programmatic interfaces of the UIWindow class.

Figure 7:
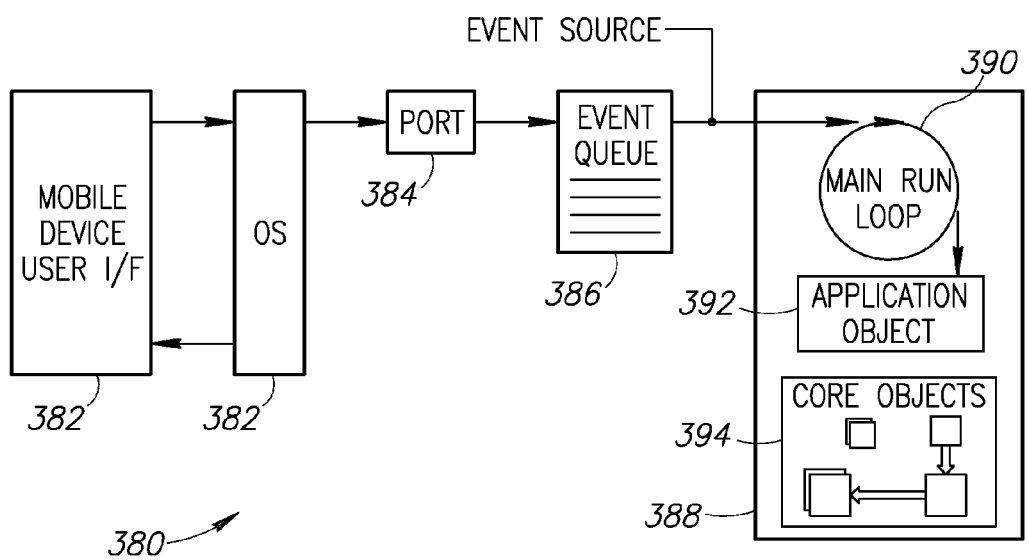
FIG. 7 is a block diagram illustrating an example client app of the mobile portfolio system.

A block diagram illustrating an example client app of the mobile portfolio system is shown in FIG. 7. The device view, generally referenced 380, comprises the mobile device user interface 382, operating system (e.g., iOS) 382, port 384, event queue 386 and app itself 388. The app comprises a main run loop 390, application object 392 and a plurality of core objects 394.

In operation, a view, i.e. an instance of the UIView class, defines a rectangular region inside a window. Views are the primary mechanism for interacting with the user in the application. Views perform several functions, including drawing and animation support, layout and subview management and event handling.

Drawing and animation support include views drawing content in their rectangular area. Some view properties can be modified to new values. Layout and subview management includes views that manage a list of subviews, allowing arbitrary hierarchies to be created. Views define their own resizing behaviors in relation to their parent view. Views can change the size and position of their subviews automatically or using custom algorithms. Event handling includes views receiving touch events and forwarding events to other objects when appropriate.

Figure 8:
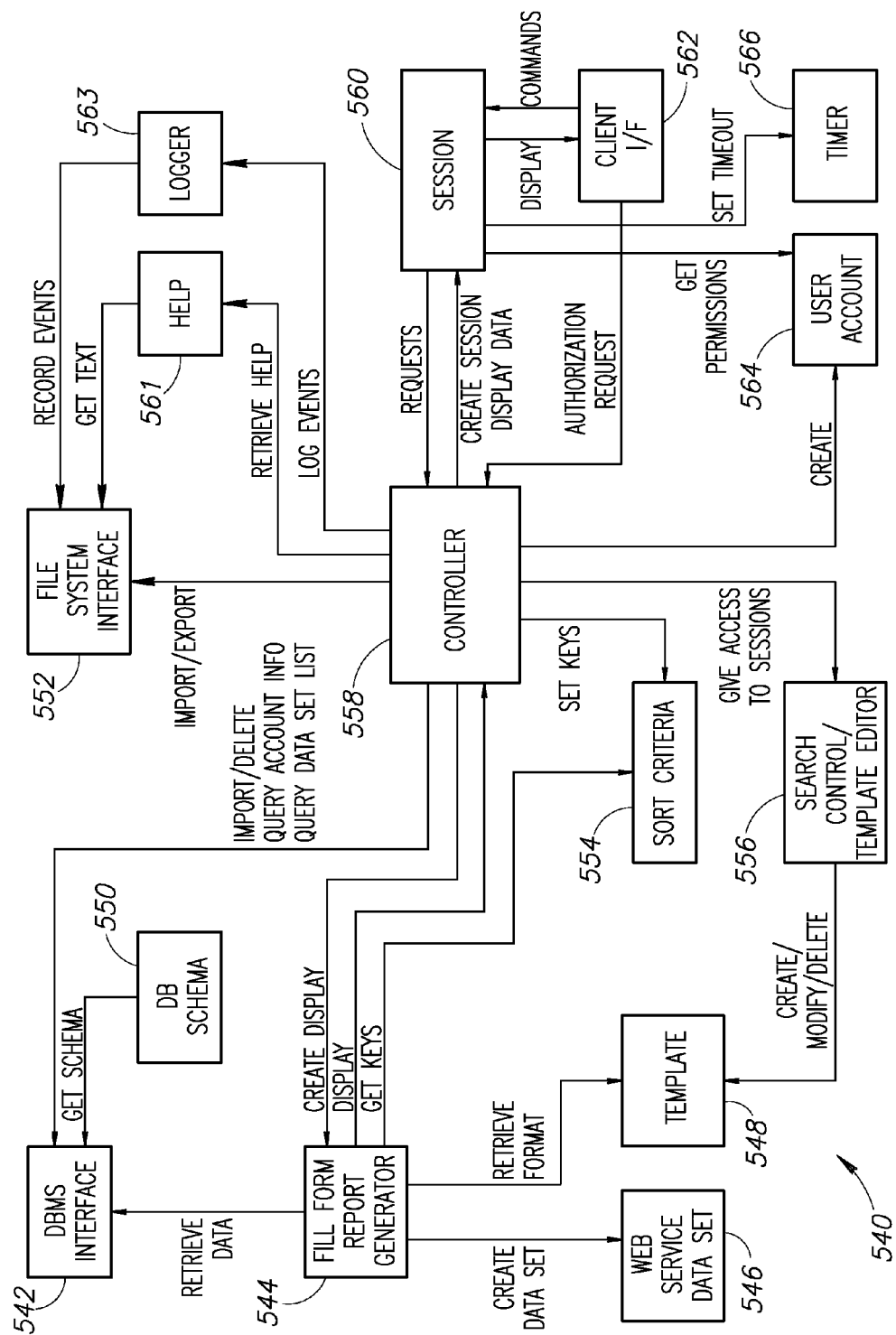
FIG. 8 is a high level system block diagram of the property portfolio system.

A high level system block diagram of the property portfolio system is shown in FIG. 8. The system, generally referenced 540, comprises login/authentication related blocks including DBMS interface 542, controller 558, session block 560, client interface block 562, user account block 564 and timer block 566. In one embodiment, the client interface 562 comprises the application user interface (UI) that is compiled using Xcode (objective C). It comprises the display screens and accepts swipes, text entry and other user generated commands, data, etc. The controller block 558 is the task responsible for the app user interface requests prior to login. The session block 560 is the task responsible for all app user interface requests for users that are logging in and authenticated. The user account block 564 contains data retrieved from the security database or other DBMS specifying the user's access level and permissions. The timer block 566 is a system object attached to a session to determine if a user has been inactive for a long enough period to be logged off by the system. The DBMS interface block 542 performs data storage and retrieval operations in the system from and to the DBMS.

The system 540 also comprises data management and display related blocks including the DBMS interface 542, fill form data/report generation block 544, database schema block 550, file system interface 552, web service block 546, template block 548, sort criteria 554, search control/template editor block 556 and controller 558. The controller 558 is operative to mediate communications between the various other blocks and between the subsystems. The template block 548 comprises a pre-defined format with filtering to apply to Web services. Template information is stored in Web Services on the server side. The sort criteria block 554 functions to use multiple sort criteria to re-order the records in the Web Services. The web services block 546 functions to retrieve data from the DBMS which incorporates the results of one or more DBMS requests. The report generation block 544, in combination with the web service data set block 546, template block 548 and sort criteria block 554 generate a formatted report in a web page. The template editor block 556 provides a service to create and modify templates. The DB schema block 550 comprises the schema of table and field layout (structure) in the DBMS (central and satellite databases). The file system block 552 comprises the computer file system for the alternate storage of data sets.

The system 540 also comprises auxiliary functionality related blocks including the file system block 552, controller block 558, help block 561 and logger block 563. Using this functionality, the controller block functions to create the required logical components and mediate communication between them. The file system block 552 functions to store help pages and one or more system logs. The help block 561 functions to create help pages when requested. Help related information is stored in the file system. The logger block 563 is operative to maintain a system log where system user actions are stored on the file system.

Figure 9:
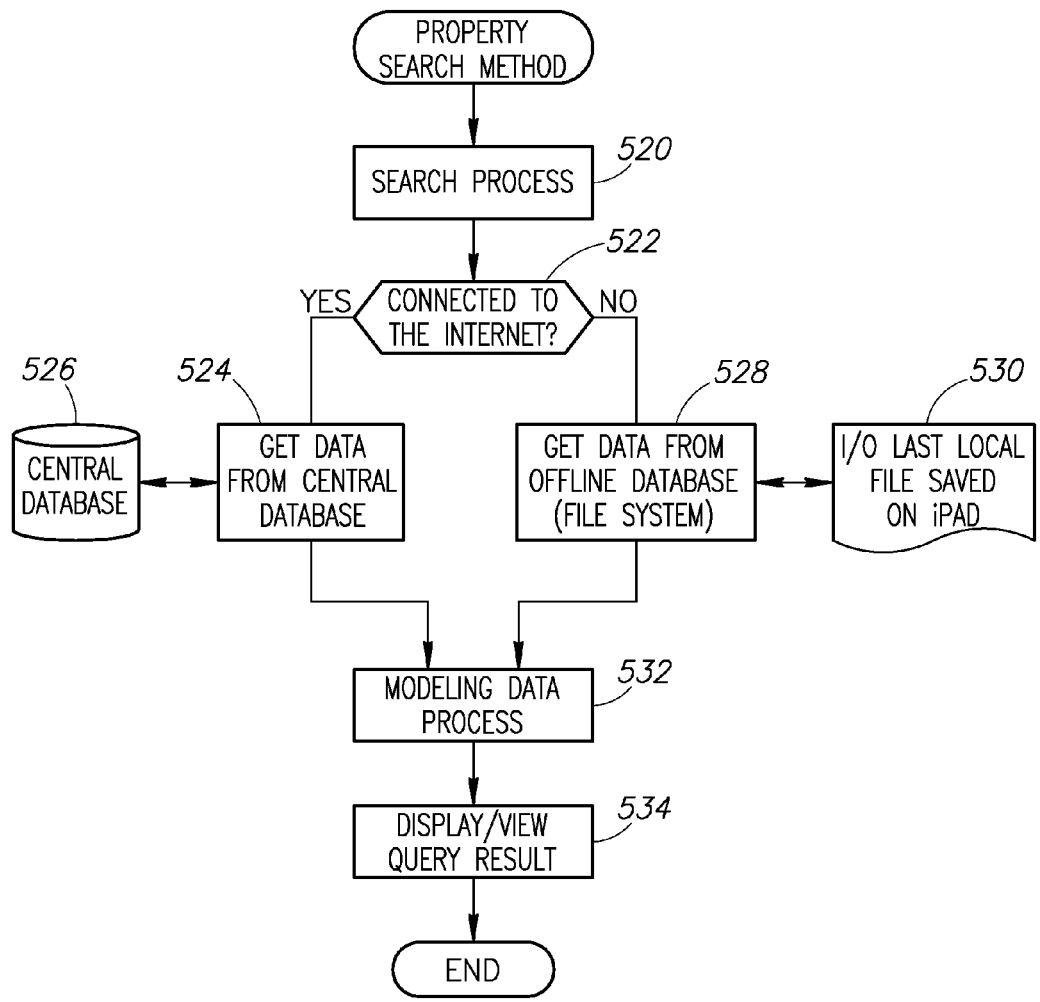
FIG. 9 is a flow diagram illustrating an example property search method of the mobile client app.

A flow diagram illustrating an example property search method of the mobile client app is shown in FIG. 9. The search method process (block 520) in the app is operative to search for property given certain search query or criteria. The particular database searched depends on whether the mobile device is connected to the internet or not (step 522). If the device is connected to the internet (i.e. access to the central database is available), then data is retrieved from the central database 526 in the central server (step 524). Conversely, if access to the central database is not available, data is retrieved from the offline database stored locally on the mobile device (i.e. via the file system) 530 (step 528). The retrieved data is processed (formatted, etc.) (step 532) and the query result is displayed to the user (step 534).

Figure 10:
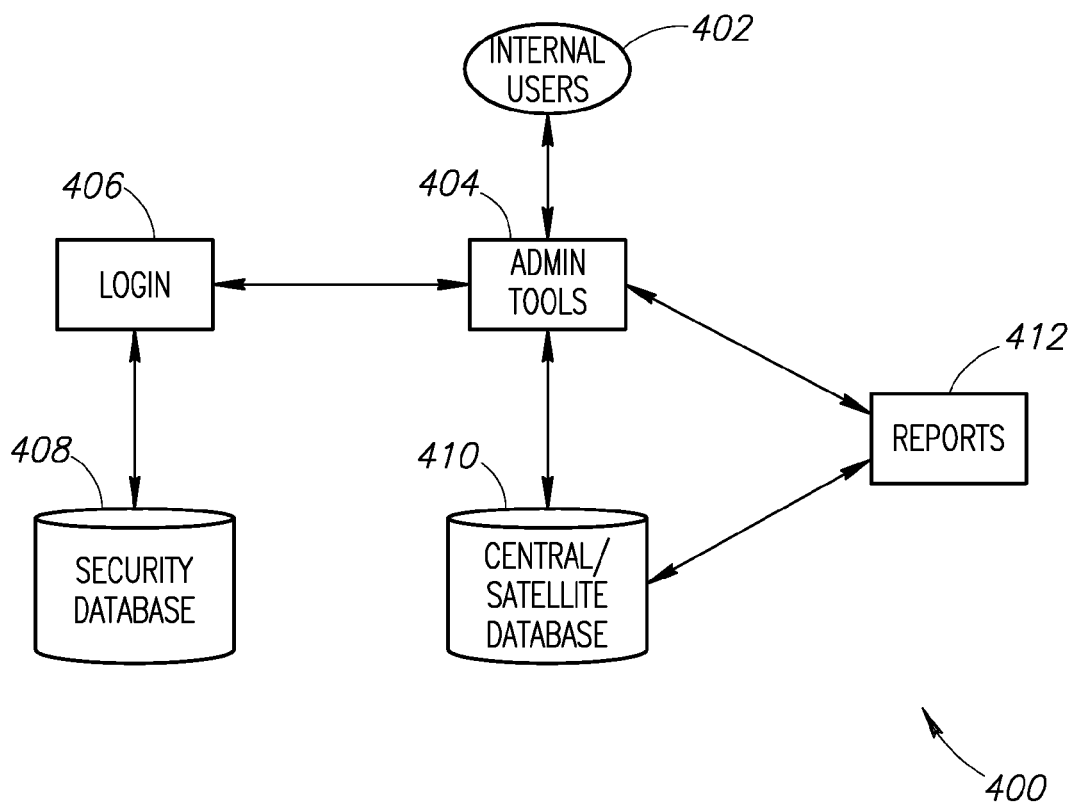
FIG. 10 is a diagram illustrating the components of a first internal user portion of the property portfolio system.

A diagram illustrating the components of a first internal user portion of the property portfolio system is shown in FIG. 10. As described supra, the property portfolio system provides access to both public users and internal users. Internal users 402 interact with the central database through a set of administrator tools (admin tools) 404. The admin tools block 404 is operative to handle the intake of property information, permit modification of existing data and delete property related data. Login block 406 is operative to configure and handle login events and coordinates user credential information storage in the security database 408. The reports block 412 is operative to generate one or more different types of reports in accordance with user input. The admin and report blocks read and write data from and to the central or satellite database 410.

In one embodiment, the actions possible by the admin tools and report blocks on the data include but are not limited to add, update, delete; information portfolio (data and images); site plan data; property information; financial data analysis; competitive (comparative) analysis; demographic data; statistics; regional office related data; leasing agent; units; tenant-broker data; tenant data; and prospective data (i.e. property not yet owned).

Figure 11:
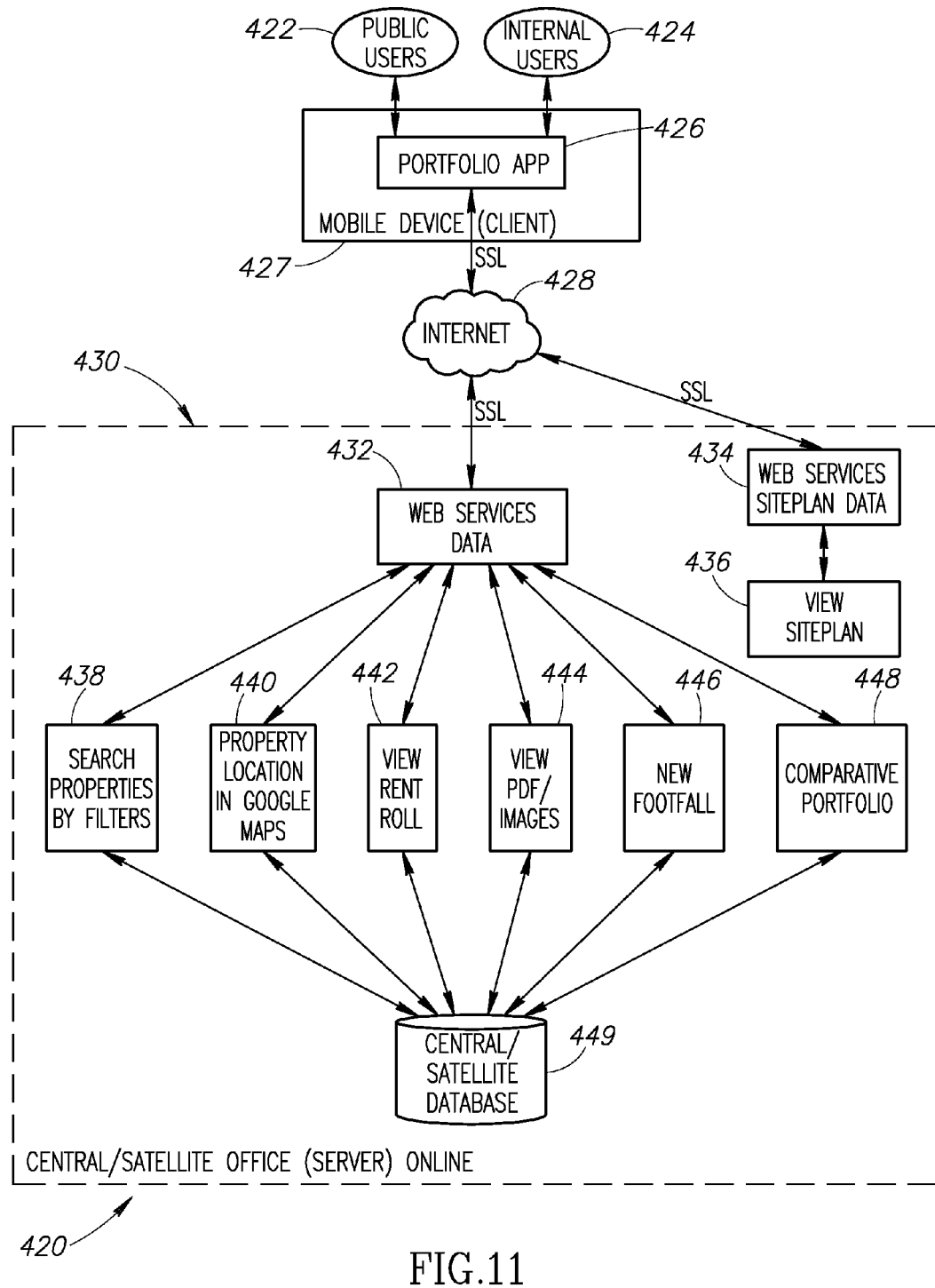
FIG. 11 is a diagram illustrating the central/satellite office connected to an online central/satellite database.

A diagram illustrating the central/satellite office connected to an online central/satellite database is shown in FIG. 11. The system, generally referenced 420, comprises a central/satellite office (server) 430 in communication with a portfolio app (client) 426 running on a mobile device 427 through the internet 428 in a client/server configuration. The central/satellite office 430 comprises several tasks including web services data task 432, web services siteplan data task 434, view siteplan task 436, search properties by filters task 438, property location in Google Maps task 440, view rent roll task 442, view PDF/images task 444, comparative portfolio task 448, new footfall task 446 and central/satellite database 449. Note that the siteplan can comprise a map of the property, tenant information, property information, and other sensitive information intended only for property managers.

In operation, public users 422 and internal users 424 interact with the portfolio app 426 on the mobile device. The app generates database requests for portfolio information, rent information, images, etc. which are sent to the server 430. Responses from the server are returned to the client 427 for formatting and display to the user.

Figure 12:
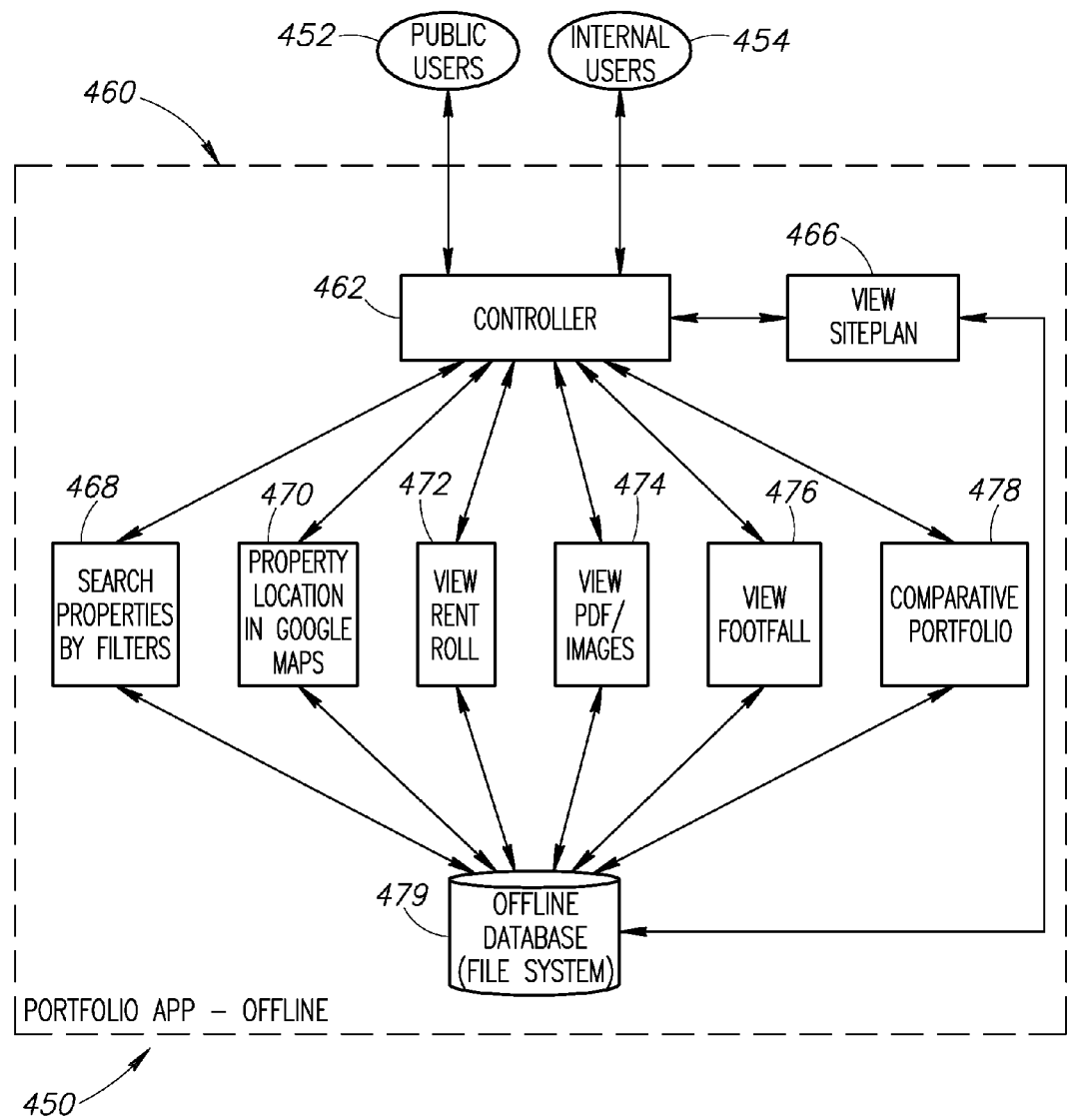
FIG. 12 is a diagram illustrating the central/satellite office connected to an offline database.

A diagram illustrating the central/satellite office connected to an offline database is shown in FIG. 12. In the event the central/satellite database is not available (no connectivity or the database is otherwise unavailable) there is no client/server configuration as in FIG. 11. Instead, an offline database is used in the mobile device file system. The portfolio app, generally referenced 450, comprises controller task 462, view siteplan task 466, search properties by filters task 468, property location in Google Maps task 470, view rent roll task 472, view PDF/images task 474, comparative portfolio task 478, new footfall task 476 and central/satellite database 479.

In operation, public users 452 and internal users 454 interact with the portfolio app 450 on the mobile device. The app generates database requests for portfolio information, rent information, images, etc. received from the users via the controller. Data is retrieved from the offline database via the file system, formatted and presented for display to the user.

Figure 13:
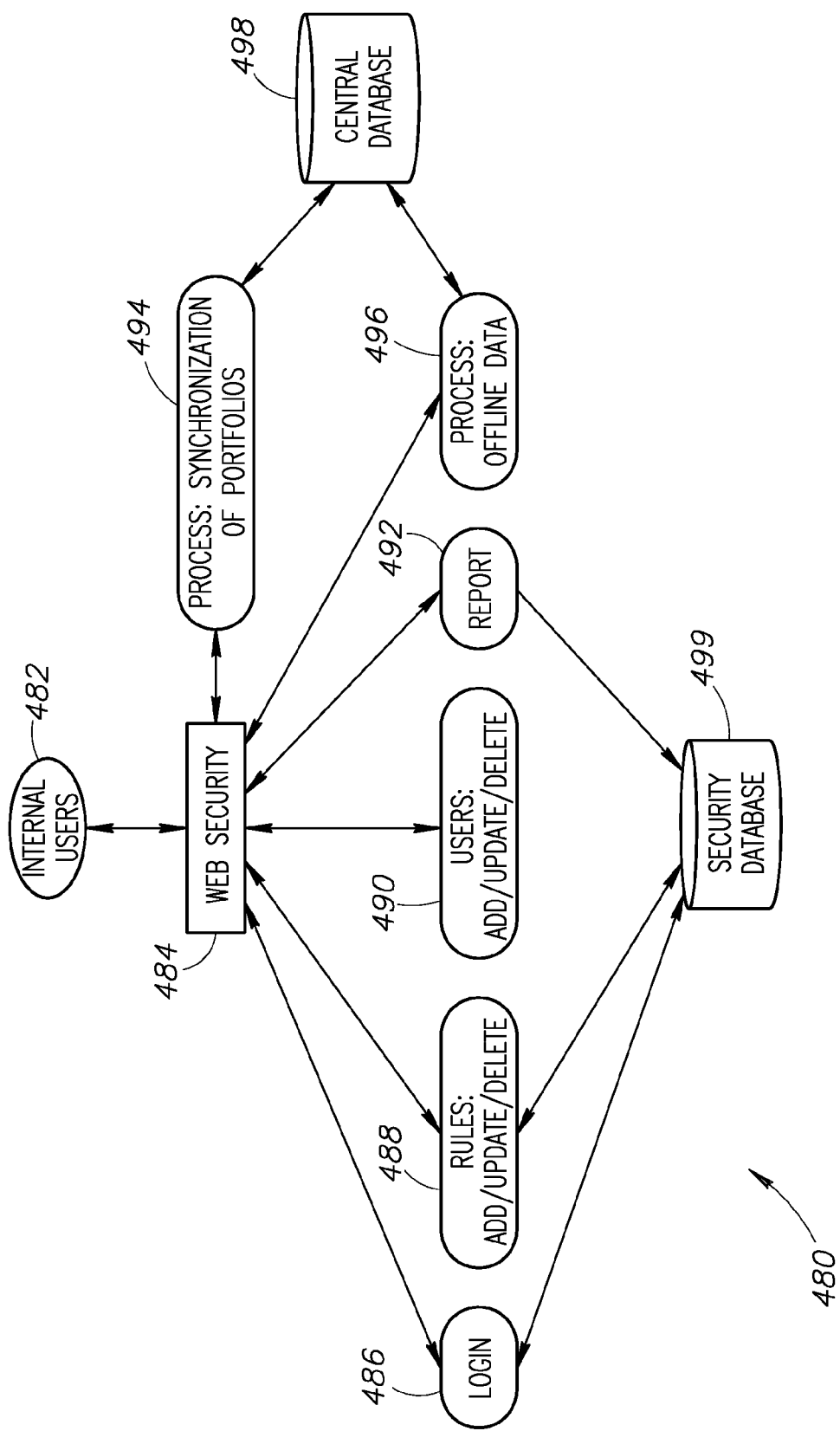
FIG. 13 is a diagram illustrating the functional components of a second internal user portion of the property portfolio system.

A diagram illustrating the functional components of a second internal user portion of the property portfolio system is shown in FIG. 13. This diagram illustrates the functional components as implemented on the central office server. Internal users (administration users) interact with the portfolio management system via web security block 484. Login credentials are checked by login module 486 which communicates with the security database 499. Permissions, including adding/updating/deleting actions, are handled by task 488 which communicates with the security database 499. Users, including adding, updating, deleting actions, are handled by task 490 which communicates with the security database 499. Security related reports are generated by task 492 which communicates with the security database 499.

The synchronization of one or more satellite portfolio databases is handled by task 494 which accesses the central office database 498. As described supra, the satellite databases are periodically synchronized with the central office database. Task 496 processes offline data whereby an offline database is generated from a snapshot of the central office database 498 for use with the portfolio app running on mobile devices when access to the central database is not possible.

Security Tool

As part of the security tool, the portfolio system provides various data input screens in which internal users can input user and security related data. In one embodiment, the security tool provides login tools and security related tools. The security related tools include user tools for searching, adding, modifying and deleting users that will have access to the Admin Tools system. Commands are provided for listing the users registered in the system. The list shows the user's main information, including user name, real name, application to which the user has access, domain, role and type of user.

A diagram illustrating an example user information page of an example portfolio management system is shown in FIG. 14. In this screen, user information is entered. If the type of user selected is "Active Directory", the system will request to indicate the domain to which it belongs. If the user is a type "Web" user, however, the system will hide the domain field and its selection will not be necessary. Nevertheless, the system will request the user to enter his password as shown in FIG. 14. For example, the User Info screen, generally referenced 170, comprises domain field for the domain to which the user will belong; a User Type input 171 where a user can select Active Directory (AD) user or web user; User Name field 172 for accessing the system; Password field 174; Real Name field 176 for the user's real name; Email field 178; Application drop down selection 180 for the application the user will have access to; and Role drop down selection 182 for the type of permission granted. An Add New button functions to open a new User Info screen and a Save button functions to save the current screen when pressed.

Also included in the security tools is the ability to configure the role or permission/authority each user will have in the system including tools for searching roles, adding new roles, deleting roles and modifying roles. A diagram illustrating an example role information page of an example portfolio management system is shown in FIG. 15. The role information, generally referenced 570, comprises a list 578 that includes the name of the object, the action and description and an allow checkbox column. Adding a new role requires the user to enter several fields including a Name field 572 indicating the name of the role; a Description field 574 indicating the detail or comment describing the functions of the role; and an Application field 576 indicating the application in which the role will be created.

Note that in one embodiment it is necessary to validate the information before deleting a role because a role cannot be deleted if it is associated with a certain user. If the role linked to a user is removed, the user is left without any role reference thus making the remaining information inconsistent, as there cannot be a user that does not have an assigned role.

The security tool also provides a synchronization module which functions to receive the synchronization packages created by external applications and add their contents to the central database. Information added or merged includes information related to properties, tenants, units, etc. If the data in the external database is not found in the central database, then it is added. If the data in the external database is found in the central database then the system updates the data in the central database (i.e. merge process).

In addition, reports can be generated such as reports that list the security by application and reports that list users by their roles (permissions). It is appreciated that numerous other reports can be generated depending on the particular implementation.

The packages created by the applications have a folder structure containing the corresponding files related to the properties, tenants, etc. and a database backup with the information to be synchronized. This backup must be previously restored in the database by an administrator to perform the data synchronization.

Administration Tool

The property portfolio system also comprises an administration tool (or admin tool) for entering, modifying, deleting, searching and listing property related information. The admin tool comprises a plurality of screens that allow an internal user to search, add, change, and delete various property related data such as basic property information, tenant information, rent information, etc. Categories permitted to be entered and modified include maintenance of country, region, state, city, prospective and portfolio related information. Additional categories include tenant, broker and property related information. Reports on any admin tool data item can be generated along with the entering of siteplan information. For each category of data type, the admin tools provide the capability of searching, adding, changing and deleting entries.

A Country Info screen is provided for adding country related information including a Name field; Abbreviation field for initials that identity a country; Latitude and Longitude fields that are used for graphics in mobile device applications; Zoom Google Map field to grant Zoom for displaying Good Maps; Currency field for indicating the currency in the particular country, such as EUR or USD; and Unit of Measure field for land and property such as square meters (SQM).

A Region Info screen is provided for adding region related information including a Name field; Abbreviation field indicating the initials identifying the region; Country field for the country in which the region belongs; and Latitude and Longitude fields for use by the mobile device application.

A Country Info screen is provided for providing state related information including a Name field; Abbreviation field; Country field for identifying the country to which the state belongs; Region field for identifying the region of the country to which the state belongs; and Latitude and Longitude fields for use by the mobile device application.

A City Info screen is provided that includes tabs for basic Info, Demographics and Statistics. On the Info tab, a City Info screen is provided for providing state related information including a Name field for the name of the city; State field for the state the city belongs to; Region field for identifying the region, depending on the state the city belongs to, the value entered changes depending on the selected state; Country field for identifying the country, depending on the selected region; and Latitude and Longitude fields for use by the mobile device application.

Additional demographic information related to the city can also be entered on the Demographics tab including a Year field indicating the year the data was entered; Rank Total Population field; Total Population field; Growth Rate field for the growth rate of the city; urban Population field; Rural Population field; and Households A, B, C fields indicating households segmented by income.

Additional statistics information related to the city can also be entered on the Statistics tab including a Year field indicating the year the data was entered; Quarter field for the quarter in which the information was obtained; GDP per capita field; Existing Gross Leasable Area (GLA) field; Future GLA field; and Retail Purchase Power field.

The admin tool also comprises screens where data related to possible future property purchases can be searched, added, modified and deleted. A Prospective Info screen includes several fields including a Name field for entering the prospective name; Portfolio field for the portfolio it would be included in; Acquisition field for indicating if a prospective is being analyzed for possible future purchase; Disposition field for indicating if a prospective is being analyzed for possible future sale; and Image File field for the name of the image containing the prospective logo.

A Batch Property Update screen permits the selection of all properties that are to belong to the selected prospective. As with other data screens, a searching system filters by country and by property name once the information is entered.

A Portfolio Info screen is used to enter information related to a portfolio. The fields included in the Portfolio Info screen include a Name field for entering the name of the portfolio; Latitude and Longitude fields which are used for mobile device applications; Zoom Google Maps field for indicating to include zoom in Google Maps display; and an Image File field for the name of the image containing the portfolio logo.

A Batch Property Update screen permits the selection of all properties that are to belong to the selected portfolio. As with other data screens, a searching system filters by country and by property name once the information is entered.

The admin tools also comprise the ability to search, add, change and delete tenant related information administered by the system. The tenant information includes a tenant category such as bank, food, non-retail, services, restaurants, etc. A Tenant Config Global screen provides fields for the global configuration Name; Tenant Logo Image File for the logo of the global configuration and Logo Map Image File for the location of the global configuration.

Figure 16:
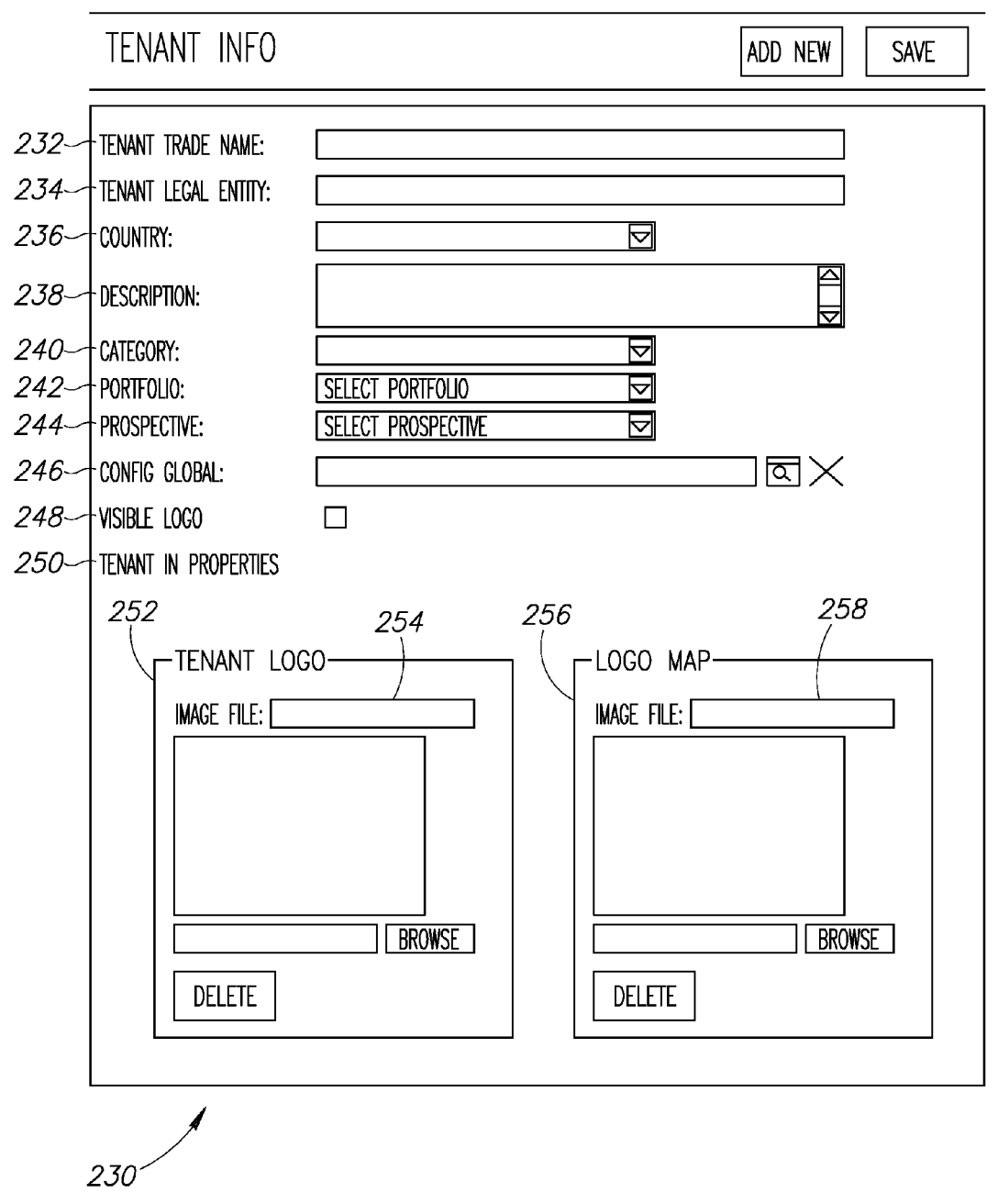

A diagram illustrating an example tenant information page of an example portfolio management system is shown in FIG. 16. Another property related screen in the admin tools is a screen for adding/changing/deleting tenant related information. The Tenant Info screen, generally referenced 230, comprises a plurality of tenant related fields. In the example screen presented, the fields include a Tenant Trade Name field 232 for the commercial name tenant, Tenant Legal Entity field 234 for the tenant's legal name, Country field 236 for the country the tenant is in, Description field 238, Category field 240 for the category the tenant belongs to, Portfolio field 242 for the portfolio the tenant refers to, Prospective field 244 for the assigned prospective, Config Global field 246, a Visible Logo check box field 248 indicating whether the logo is visible in screens and corresponding reports; Tenant is Properties field listing the properties the tenant is related to; Tenant Logo 252 including Image File field 254 and Tenant Logo Map 256 with Image File field 258. An Add New button functions to open a new Tenant Info screen and a Save button functions to save the current screen when pressed.

The admin tool also comprises the ability to maintain broker related information. In one embodiment, a screen comprises several tabs including an Info tab for general broker information; a Coverage City tab, Coverage Region tab and List Contacts tab.

The Info tab screen includes several broker related fields including a Name field for the name of the brokerage company; City field for the city where the broker is located; Address field for the broker company address; a Phone field for the telephone number and a Fax field for the facsimile number of the broker. The Coverage City tab includes a field for the desired coverage city to be added to the coverage cities list. The Coverage Region tab includes a field for the desired region to be added to the coverage cities list. The List Contacts tab includes fields for Name and Surname of the brokerage company contact.

The brokerage related information also includes a contact list. Screens are provided for searching, adding, changing and deleting broker contacts. The new contact screen includes a Name field for the contact's name; Surname field for the contact surname; Company field for the company the contact belongs to; E-Mail field for the e-mail address of the contact; Phone field for the contact's telephone number; Mobile field for the contact's cellular phone number; and Fax field for the contact's facsimile number.

The leasing agents associated with properties are also maintained by the portfolio system. Actions include search, add, change, and delete of leasing agent information. A Leasing Agent Info screen comprises relevant fields including a First Name field for the agent's first name; Last Name field for the agent's surname; Phone field for the telephone number of the agent; E-Mail field for the e-mail address of the agent; City field for the city the agent belongs to; Address field for the personal agent's address; Area Code field for the postal code of the agent; Role field for the role assigned to the agent; Property Manager field for the property's administrator; and Portfolio field for the portfolio to the agent belongs.

The regional office associated with a property is also maintained by the portfolio system. Actions include search, add, change, and delete of regional office information. A Regional Office Info screen comprises relevant fields including a Legal Name field for the legal name of the regional office; City field for the city of the regional office; Country field for the country of the regional office; Description field for a description or comments; Address field for the address of the regional office; Area Code field for the postal code of the regional office; Portfolio field for portfolio of the regional office; Regional Office Image field for the name of the Image File that contains the regional office logo and Leasing Agent field for a listing of all the leasing agents belonging to the city that the office belongs to.

The portfolio system also comprises Property Status screens where one can search, list, add, modify and delete the different properties states that are administered by the system. Examples of property status include Acquisition, Active, Disposition, Inactive, Monitor, Purchased, etc. Note that property status can be entered into the system as well as synchronized from other applications.

The portfolio system also comprises Property Type screens where one can search, list, add, modify and delete the different properties types that are administered by the system. Examples of property type include Development, Operating, Portfolio, Stand Alone, etc. Note that property type can be entered into the system as well as synchronized from other applications.

One of the key screens provided by the portfolio system of the invention is for entering data related to properties. A diagram illustrating an example property information page of an example portfolio management system is shown in FIG. 17. The Property Info screen, generally referenced 190, comprises several tabs 191 where each tab displays different data related to a property. In the example screen shown, for example, tabs include Info, Miscellaneous, Floor, Files, Statistics, Demographics and Tenant. An Add New button functions to open a new Property Info screen and a Save button functions to save the current screen when pressed. Properties can be searched, listed, added, changed and deleted.

In the example screen presented herein, the data fields for the Info tab include a property Name field 192, property Number field 194, property Legal Name field 196, Trade Name field 198 for the commercial name of the property, Address field 200 for the commercial address of the property, Area Code field 202 for the postal code of the property, City field 204 for the city of the property, Contact field 206 for the contact associated with the property, Prospective field 208, Portfolio field 210, Status field 212 for property status, Type field 214 for the type of property, Description field 216 for a comment or detail describing the property, Update field 218 for a comment or detail concerning any updates to the property, Latitude field 220 and Longitude field 222 for use in mobile device application, Last Update field 224 for the data and time of the last property update performed, Upload SWF File field 226 for the field used to load the siteplan to the property, Siteplan SWF field 227 for the siteplan name and Web Pages section 228 which includes a Name field 229 for the web page list which references the property.

The Miscellaneous tab is a screen comprising various fields including a Leasing Agent field indicating the leasing agent for the property; Year of Opening field indicating the year the property opened; a Renovated field indicating the record of the refurbishments made to the property; a Site Area field; Asking Price field; Holding Ownership field; Shopping Center Cluster field; Value field; Units Total field indicating the total number of units in the property; Units Retail field indicating the total number of retail units in the property; Units Storage field indicating the total number of storage units in the property; Units Office field indicating the total number of office units in the property; No of Parking Places field indicating the number of parking spots; GLA Retail field indicates the surface area occupied by the retail units; Total GLA field; Storage GLA field indicates the surface area occupied by the storage units; Office GLA field indicates the surface area occupied by the office units; Potential GLA field indicates how the surface area of the property can grow based on refurbishments; Used by Owner GLA field indicates the space used by the property owners; Km from City Center field indicates the distance between the property and the city center; Public Transportation Bus field indicates the number of buses that run in the vicinity of the property; Public Transportation Metros field indicates the number of metros that run in the vicinity of the property; Public Transportation Train field indicates the number of trains that run in the vicinity of the property; Public Transportation Tram field indicates the number of trams that run in the vicinity of the property; LOI/Option field; Initial Due Diligence field; Sale Agreement field; and Final Due Diligence.

The Floor tab is a screen comprising fields including a Floors Quantity field indicating the total number of floors the property has; and a Name field for the name assigned to the floor, any number of which may be added. The user enters the different floors that are in the building. If a floor is not defined for a property then unit information will not be able to be entered. In addition, the number of floors entered corresponds to the number of tabs displayed to navigate between the floors in the mobile device application.

The Files tab is a screen comprising fields for entering files associated with a property. The screen comprises fields including a Name field for the name of the file; Type field for the type of file, e.g., Picture, Property Info, Demographic, etc.; Public checkbox field indicating whether the file is public or not; Show Property Info field shows is the type 'Picture' is selected and indicates if the image can be used in the Property Info option in the mobile device application; Description field for details or comments related to the entered file; Physical File field indicates whether the file is physical or not; and Upload File field for entering the file name for uploading.

Under the Files tab, the user can add any number of attachment files. By selecting the correct file type different icons and functionality in the front end is activated. First, the desired file name to display as the title to the file is entered, followed by the file type. Every file type has its own designated icon in the front end. If the specific file type the user is interested in is not present, the user selects other and the information displays under the property information section in the front end. Files available to upload are image files and PDF. In an alternative embodiment, any desired file type may be uploaded. A selection whether the file is for public or private use is entered. This information is used internally or for private use. A short description of the file is entered and a selection whether the file is a physical file or a url is made. If it is a physical file it must be uploaded. Once all the information has been entered for the file, the user clicks the 'Add New' button. This creates a new line on the grid under the entry section. Any number of files may be entered for a property.

The Statistics tab is a screen comprising fields for statistical information about the property. The screen comprises fields including a Year field for the year in which the statistical data entered is based on; Quarter field for the quarter of the year in which the statistical data entered is based on; Base Rent field; Gross Rent Income (GRI) field; Net Rent Income (NRI) field; NRI/GRI Margin (%) field; Market Value (MV) field; Equivalent Yield (EY) (%) field; Occupancy (%) field; Marketing Expenses field; and Service Charges Expenses field.

The Demographics tab is a screen comprising fields for entering and displaying demographic information about the property. The screen comprises fields including a Year field indicating the year in which the demographic data entered is based on; Population 5 min field indicating the total population 5 minutes from the property; Population 10 min field indicating the total population 10 minutes from the property; Population 15 min field indicating the total population 15 minutes from the property; Population 30 min field indicating the total population 30 minutes from the property; Number of Households field indicating the number of households; Household Income (Median) field for the average household income; Daily Commuters field indicating the daily estimated population of travelers for the selected year; Daily Population field indicating the daily estimated population for the selected year; and Annual Traffic Count field indicating the annual traffic count.

The Tenant tab is a screen comprising fields for entering and displaying property tenants. When entering a new property, the tab does not function since the tenants belong to the units assigned to the property. As the property is only just being created, there are no units related to it yet. Once this data is populated, it will appear in this tab. The screen comprises both major tenants and anchor tenants.

The portfolio management system also provides the capability of searching, listing, adding, changing and deleting units. Unit related information can be entered into the system or may be synchronized from other applications. The add Unit Info screen comprises several fields for entering unit related information including a Property field indicating the property associated with the unit; Floor field indicating the floor of the property associated with the unit; Unit Type field indicating the type of unit (e.g., Retail, Storage, Office, etc.); Unit # field indicating a code or identifying number of the unit; App. Unit # field indicating the code or identifying number used to relate the siteplan unit to the load unit; SQM field indicating the total square meters of the unit; Tenant field indicating the tenant related to the unit; Available checkbox field indicating if the property is active or not; Visible Logo (SWF) checkbox field indicating if the logo will be displayed or not in the siteplan for the unit; Configure Logo (SWF) checkbox field indicating if the logo is drawn in the siteplan for the unit; Lease Reference Code field indicating the leasing contract reference code; Lease Start Date field indicating the starting leasing contract date; Lease End Date field indicating the ending leasing contract date; Lease File field for uploading a Lease File and a Lease File name for the leasing contract.

Mobile Device Portfolio Management Application

As described supra, the portfolio management system of them present invention comprises an application (widely referred to as an 'app') adapted to execute on a mobile device such as a smartphone (e.g., iPhone, Android powered phone, etc.), tablet (e.g., iPad, Galaxy, etc.) or other suitable mobile computing platform. The application is operative to provide a user the ability to view, display, interact with and modify a real estate portfolio database located on a central server, stored in the cloud or stored locally on the mobile device itself (in the event the cloud or server version of the database is not available).

Figure 18:
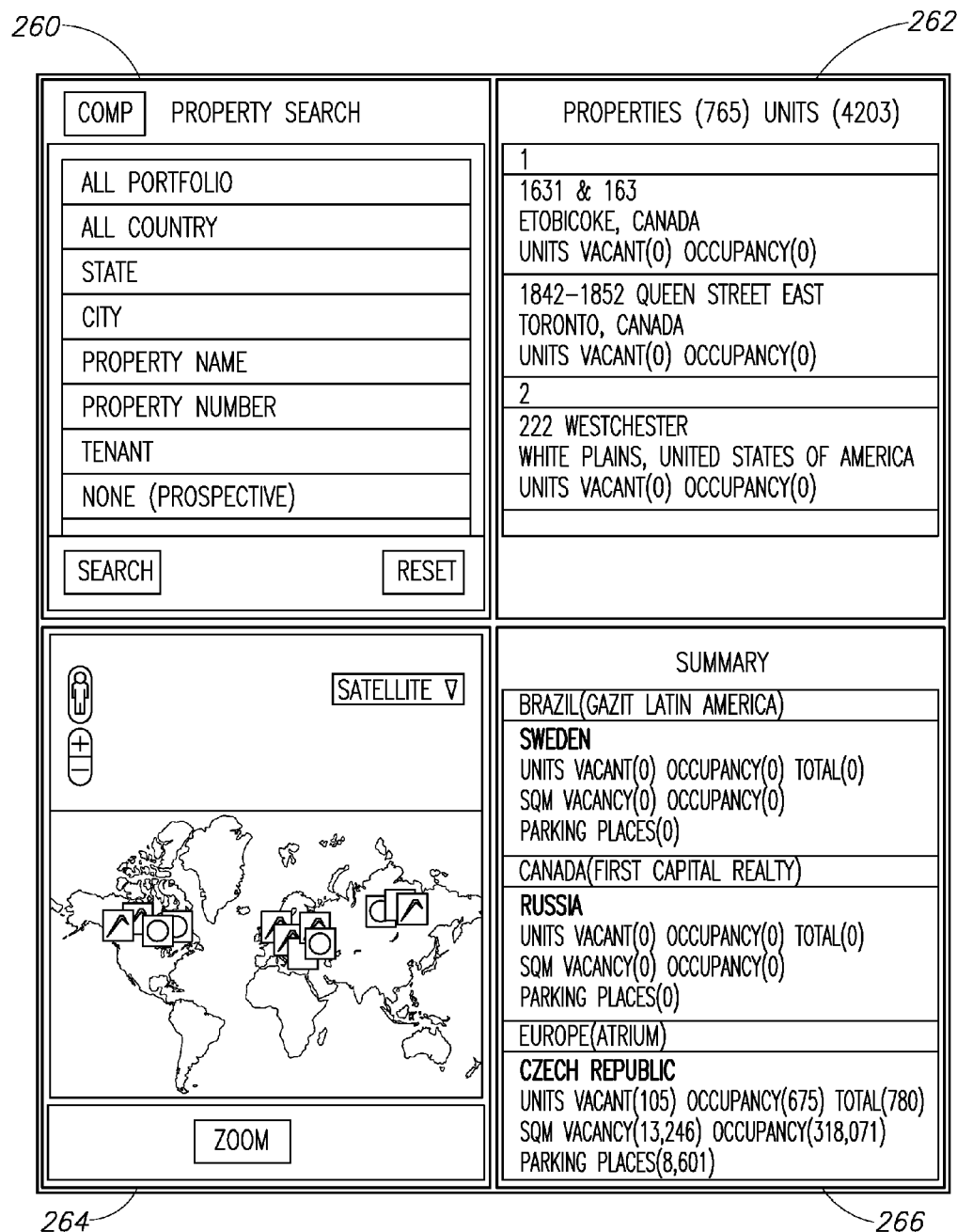
FIG. 18 is a diagram illustrating an example home screen of an example portfolio management system.

A diagram illustrating an example home screen of an example portfolio management system is shown in FIG. 18. In one example embodiment, upon launching the application, the screen presented is divided into four parts or sectors and include a property search sector 260, property detail sector 262, map display (Google Maps) sector 264 showing the location of the properties and a summary sector 266. The screen displays a list of all the registered properties in alphabetical order by name.

Figure 19:
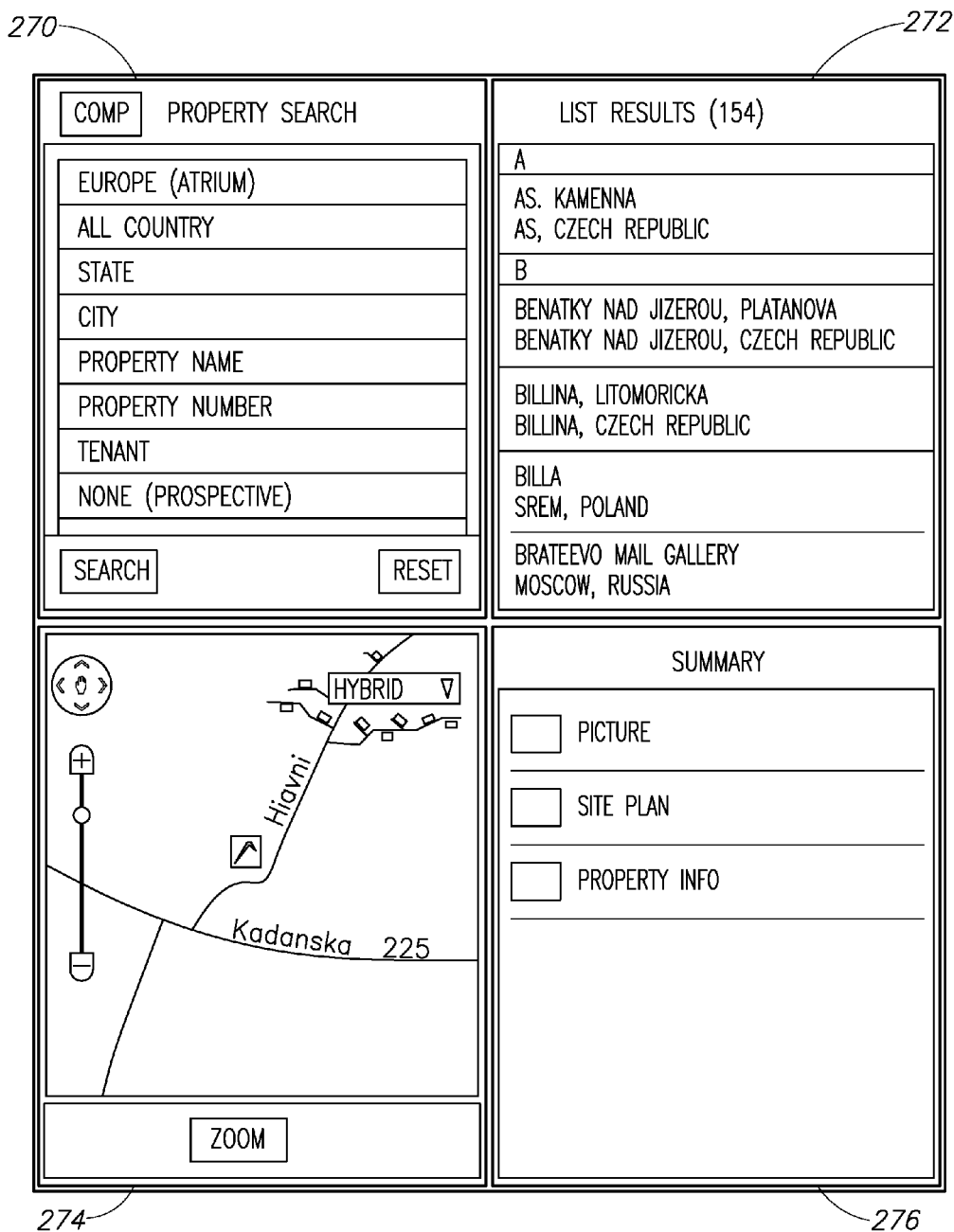
FIG. 19 is a diagram illustrating another example home screen of an example portfolio management system.

A diagram illustrating another example home screen of an example portfolio management system is shown in FIG. 19. This alternate screen is also displayed upon launch of the application and is divided into four sectors, including a property search sector 270, list result sector 272, map display (Google Map) sector 274 and a summary sector 276.

The property search sector 260, 270 is the first listing shown in the initial startup screen. In this sector, a user can search properties using different filters. As one can appreciate there are fields that can be edited and the others that can be selected, for example: City, Property name, Property Number and Tenant, are fields that can be edited. This means that when positioned on either of them the system will allow writing the desired information, for example a property can be searched by its name or number. The fields can be selected wherein, for example, the first field selects the desired country. By default, the selected option is "All Country" but the system permits the desired country to be selected along with the portfolio or prospective. The system also allows a user to search properties using information about their related units, whether they are occupied, vacant or both, by pressing the appropriate "checkbox". Another filter for the property search sector is by property size in square meters (SQM). A user presses the "Unit SQM" option to use this filter and the system displays three fields allowing the entry of corresponding values. If a search by tenant is performed, the portfolio logo is no longer displayed in the map sector. Instead, the tenant logo appears on each of the properties it is located in. A "Search" button is provided to initiate a search based on the entered one or more search fields. A "Reset" button is also provided wherein by pressing this button the values in the fields are reset or blanked allowing a user to begin a new property search from the beginning.

Figure 20:
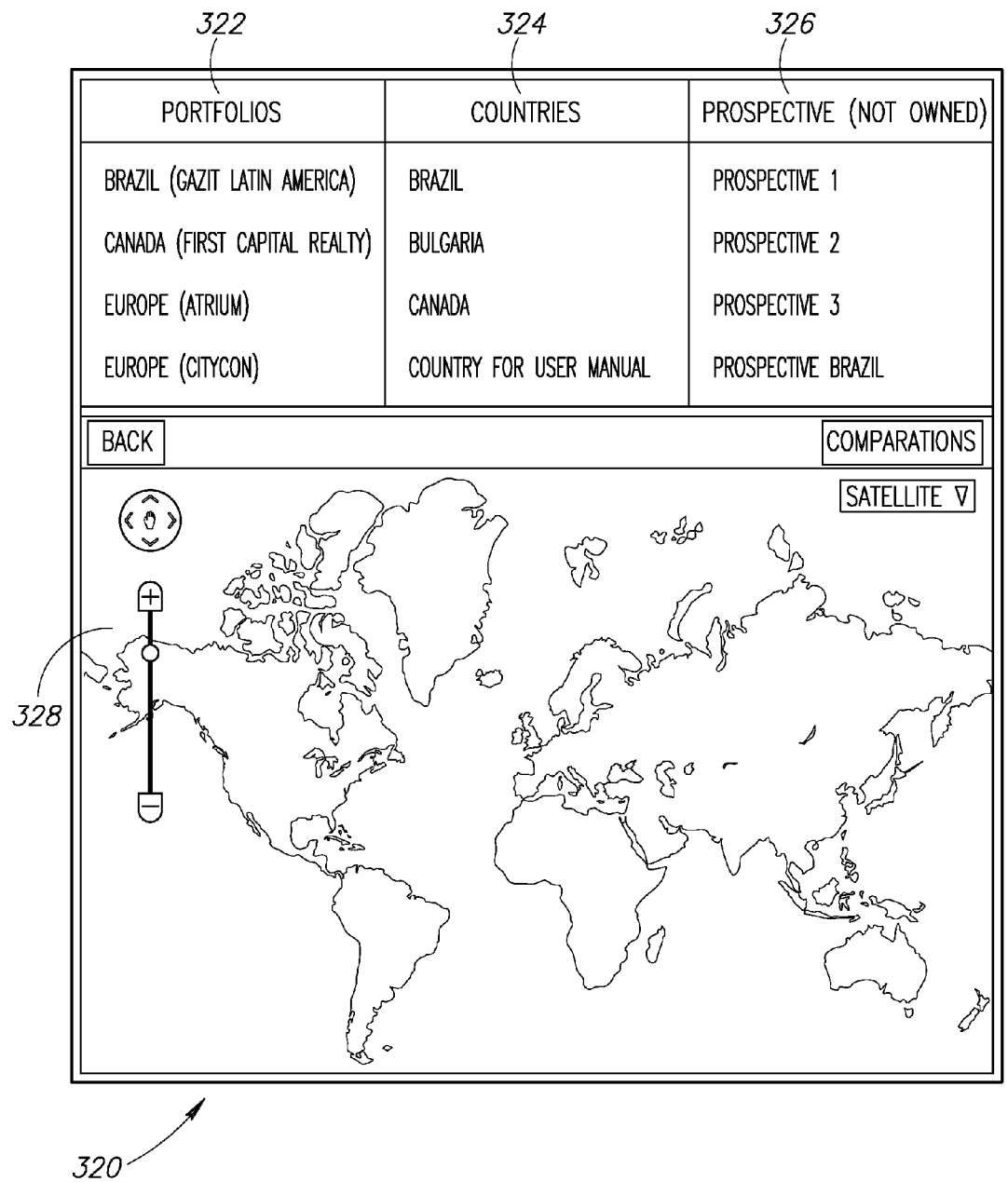
FIG. 20 is a diagram illustrating an example of a property comparison screen of an example portfolio management system.

Pressing the "Comp" button initiates a comparison operation and opens a comparison screen as shown in FIG. 20. The screen, generally referenced 320, is divided into several sectors including a Portfolios sector 322, Countries sector 324, Prospective sector 326 and a map sector 328. In this screen, a user can make a comparison of properties associated with a certain portfolio to properties from a certain prospective. In addition, the user can add filtering by country, such that properties and portfolio properties of a certain country will be compared, otherwise the properties of all countries are compared. To make a comparison a user selects the desired portfolio from the portfolio list and the desired prospective from the prospective list as shown in FIG. 20.

Portfolios are selected from the portfolios sector 322, countries are selected from a countries sector 324 and prospectives are selected from a prospectives sector 326. Once the desired options are selected, the user presses the "Comparisons" button. The system then performs the comparison process and when it is finished, the system displays the corresponding icon for each property in the map sector 328. If the property belongs to a portfolio then the portfolio icon is displayed, otherwise, the prospective icon is displayed and all related data is displayed in the map sector 328. The map display permits a user to zoom in or out of the world map. Clicking the "Back" button returns the user to the previous screen.

After entering search criteria, and performing the search, the system displays the obtained results in the properties sector 262. In response to the user input, the application forms a search query (data request) that is forwarded to the database (either on the central office server, located in the cloud or locally on the mobile device itself). As shown in FIG. 18, the properties are listed alphabetically by name. The application enables a user to scroll down until the desired property is found. To improve searching, the system displays an alphabet in columnar format on the right of the sector display in which pressing the corresponding letter takes the user to the properties whose names begin with that letter.

Sectors 262 and 266 shows the number of properties that were found in the search along with other information such as the number of vacant units, occupancy, SQM, parking places, etc. For each of the properties that appear in the search results, a corresponding icon is shown on the map displayed in sector 264. The icon is placed in a position corresponding to the "Latitude" "Longitude" fields previously entered for the property using the admin tool.

Figure 21:
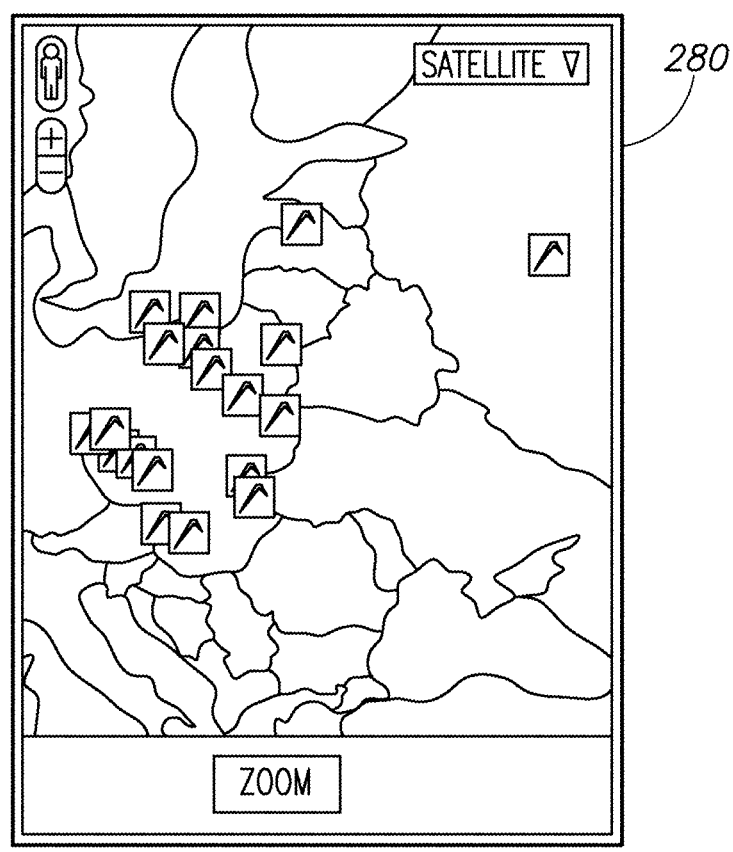
FIG. 21 is a diagram illustrating an example map screen of an example portfolio management system.

Another sample map display view is shown in FIG. 21. The map display 280 is, for example, a zoomed in version of the view sector 264 shown in FIG. 18. When selecting a property from the display map 280, the system shows the corresponding row as shown in sector display 272. Once the property is selected ("Bilina, Litomericka" in the Czech Republic, in the example display), the property is located in the sector display 274 with some zoom. In addition, the options in the lower right sector display view 276 that until now did not have options, are now enabled. In particular, the options offered in display view 276 include viewing a Picture, Site Plan or Property Information.

The property displayed in sector view 274 is centered on the map with the corresponding logo. In addition to the image, several other options are shown as described below. A "Zoom" button allows the user to increase the size of the image so as to display it in great detail. "+ and −" buttons permit a user to increase or decrease the satellite height provided by Google Maps on the territory currently displayed.

Several types of views are provided to the user. These include the display modes provided by Google Maps. One view type is the Normal view type which includes the political map with the names of locations. At first it shows the different countries, but when enlarged, it shows the important cities, roads, etc. Enlarging the image even further causes the name of the streets, squares, neighborhoods, etc. to be seen. The Satellite view type allows a user to see the world with images taken from a satellite, while the Hybrid view type (shown by default) combines both the satellite view and the normal view. The different locations, streets, etc. are drawn on the satellite pictures.

The system also provides two types of summary view options. One summary view option is a Summary Global such as shown in the Summary sector display view 266 shown in FIG. 18. This option is displayed when the user is able to select a property. In this case, the system shows a series of indicators in accordance with the query generated/entered.

The Summary Property sector display view 276 in FIG. 19 shows a number of options that are enabled depending on the information characteristics of the particular property. In the example presented, only three options are shown, namely Picture, Site Plan and Property Info. If the property contains all the information loaded, this "Summary" display will show a total of six options as described herein below.

The Picture option when clicked, allows the user to browse a gallery of images that have been entered for the property. The Site Plan option when clicked, allows the user to visualize the property site plan, detailing the occupied and vacant units, as well as the contracting tenants, units' spaces, etc. The Property Info option when clicked, allows the user to view detailed information about the property, from its address to the statistical data, major tenants, etc. The Competitive Analysis option when clicked, a user with a list of all the files of "Competitive Analysis" type that have been entered/configured with the property so that they can be visualized by users. The Demographic option when clicked provides the user with a list of all files of "Demographic" type that have been entered into the property so that they can be visualized by users. The Financial Analysis option when clicked provides the user with a list of all files of "Financial Analysis" type that have been entered into the property so that they can be visualized by users.

Figure 22:
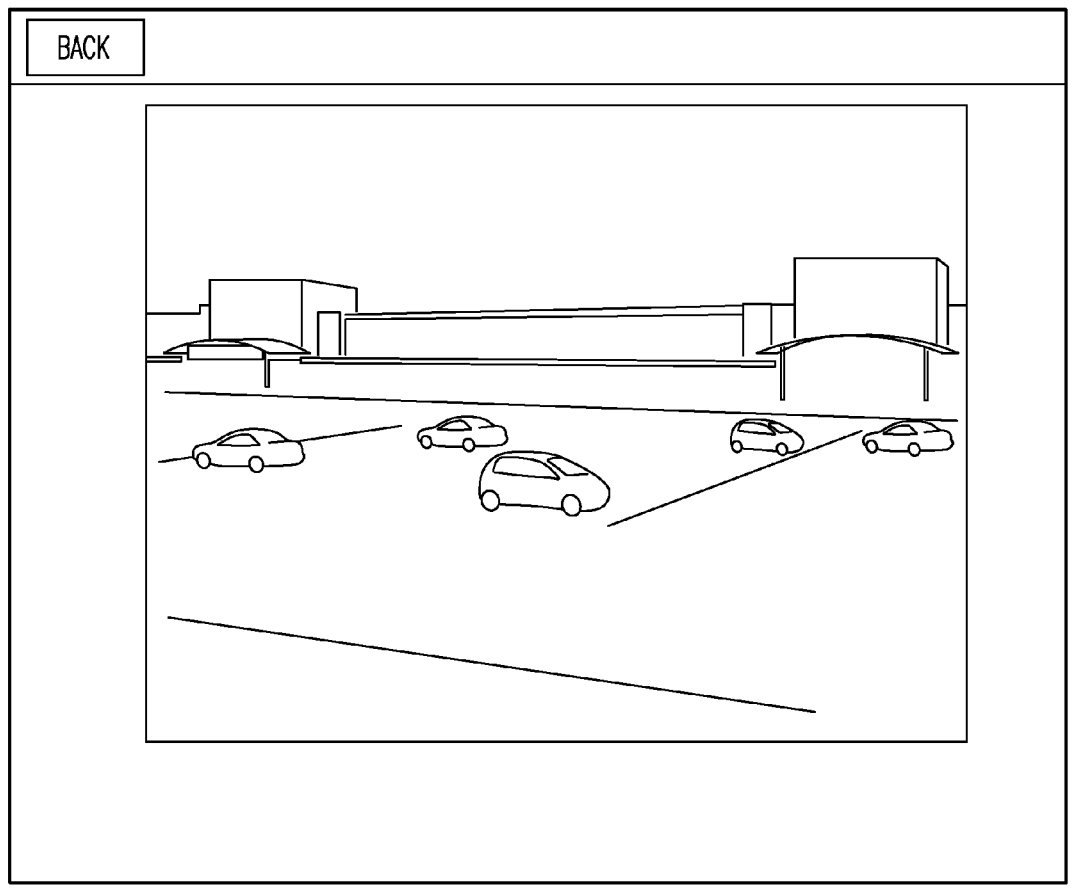
FIG. 22 is a diagram illustrating an example property image screen of an example portfolio management system.

As described supra, when selecting a property, the options provided in the display view sector 276 in FIG. 19 are enabled. These options are described in more detail infra. The "Picture" option when clicked displays one or more images associated with the property. An example property image is shown in FIG. 22. Pressing this option causes the application to display an images gallery that has been entered into the system such as via the admin tool. To display the images, a user navigates through the available images. The Next and Back buttons are displayed accordingly depending on the number of images and where in the gallery the user is viewing. To return to the previous screen, the "Back" button is pressed. To proceed to the next image the "Next button is pressed.

Figure 23:
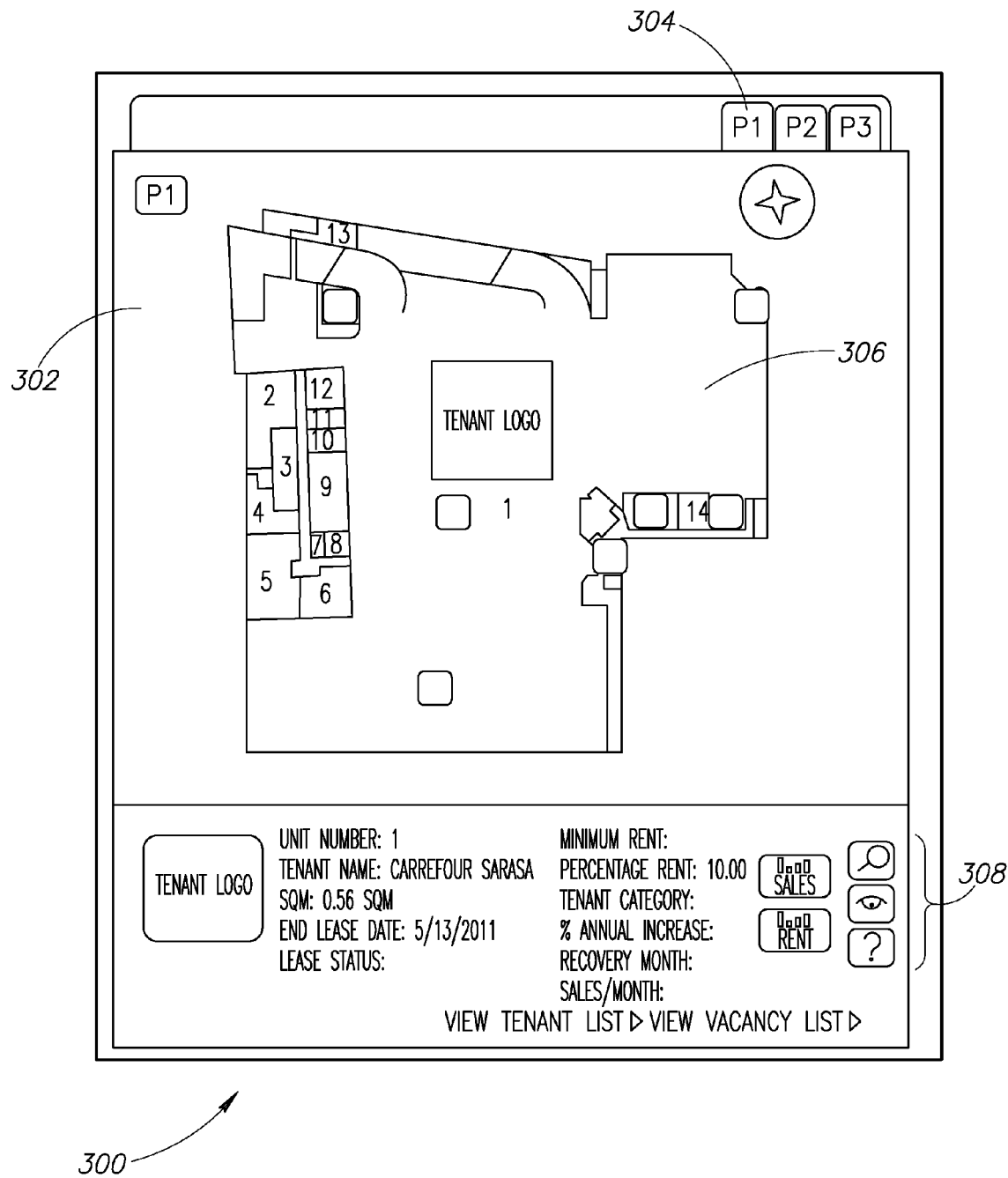
FIG. 23 is a diagram illustrating an example property layout screen of an example portfolio management system.

The Site Plan option when clicked displays the property site plan, including the spaces the property has, and in case they exist, the tenants that are currently leasing each space. An example site plan view is shown in FIG. 23. The site plan view, generally referenced 300, comprises a floor plan view 302 in the upper portion of the view and additional information displayed in the lower portion of the view. Additional information may include, for example unit number, tenant name, AQM, end lease state, lease status, minimum rent, percentage rent, tenant category, % annual increase, recovery month and sales per month.

Several floor plans can be displayed where each is associated with a tab 304 in the upper right portion of the display. Clicking on a tab displays the corresponding floor plan. The example view shown has three tabs "P1", "P2", and "P3". The "P1" tab represents the name of the floor plan "P1". It is noted that the P1 property has only one floor, but if it had more than one floor, the application would include a tab for each floor.

In addition to the floor plan for each selected floor, the application shows additional details including for example the detail of the number of vacant units, number of occupied units and what tenant has hired that unit. "View Tenant" list and "View Vacancy" list buttons in the lower right of the display provide list views of tenants and vacancies, respectively. When the "View Vacancy list" button is pressed the application displays the list of the vacant units and the link changes to "Hide Vacancy list" allowing the detail of the vacant units to be hidden. The detail of the displayed results is ordered according to the space (SQM), This means that those units with more space will appear first. On the other hand, and in a similar manner, the tenants list can be displayed. When the button "View Tenant list" is pressed, the tenants list is displayed also arranged in order of the size of the rented space. To hide the list, a user presses the button again whose label has now been changed to "Hide Tenant list".

Other functionality displayed by this screen includes the ability to select a unit within the site plan. A unit is selected from the numbered units in the entire site plan. As indicated in the example site plan view shown in FIG. 23, unit number 1 (referenced 306) is selected. Upon selecting this unit, the application displays information related to the selected unit as shown in the bottom portion 308 of the screen. In the bottom portion 308, the application displays the unit number, the logo of the tenant that is leasing the unit (if they have one), the tenant's name, the total unit space expressed in SQM and rent roll information. If a tenant does not have an assigned logo, an empty box without content is shown instead.

Figure 24:
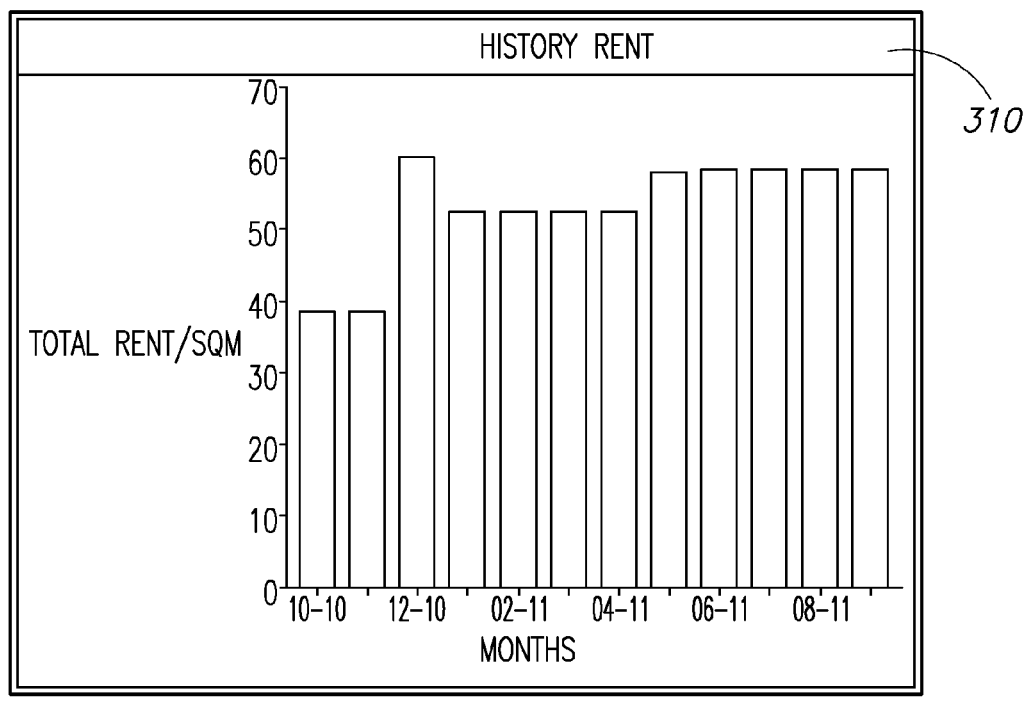
FIG. 24 is a diagram illustrating an example rent history graph screen of an example portfolio management system.
Figure 25:
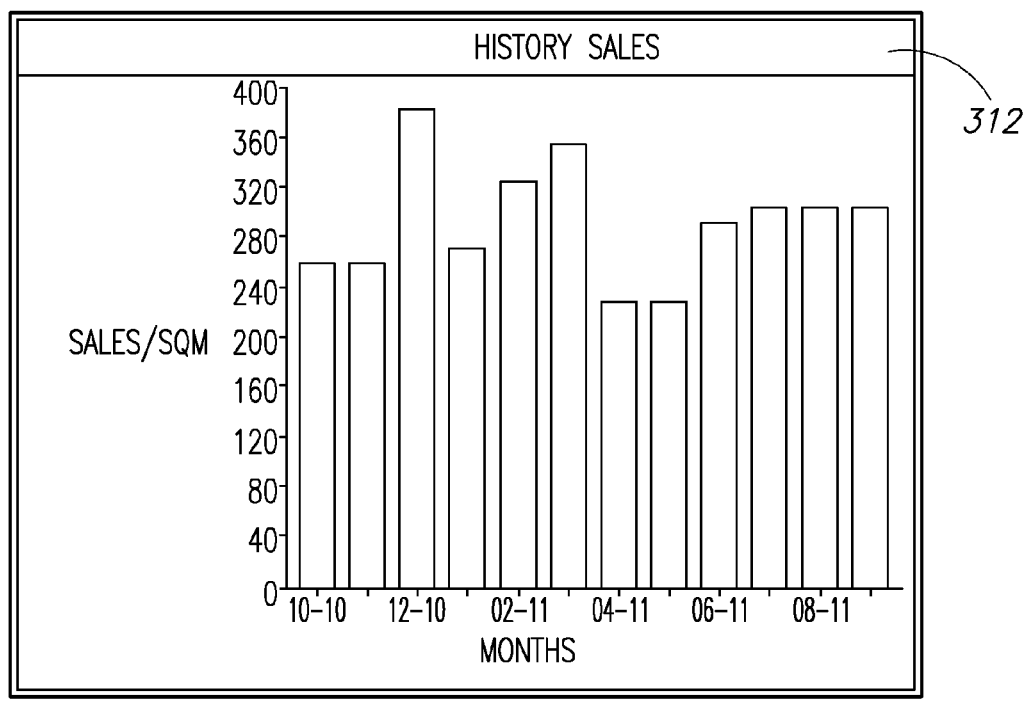
FIG. 25 is a diagram illustrating an example sales history screen of an example portfolio management system.

Included in the information displayed in the bottom portion 308 is rent and sales history. An example graph displaying total rent per SQM versus time is shown in FIG. 24. An example graph displaying total sales per SQM versus time is shown in FIG. 25. It is appreciated that other historical information graphs can be displayed to the user in accordance with the particular implementation of the application.

Figure 26:
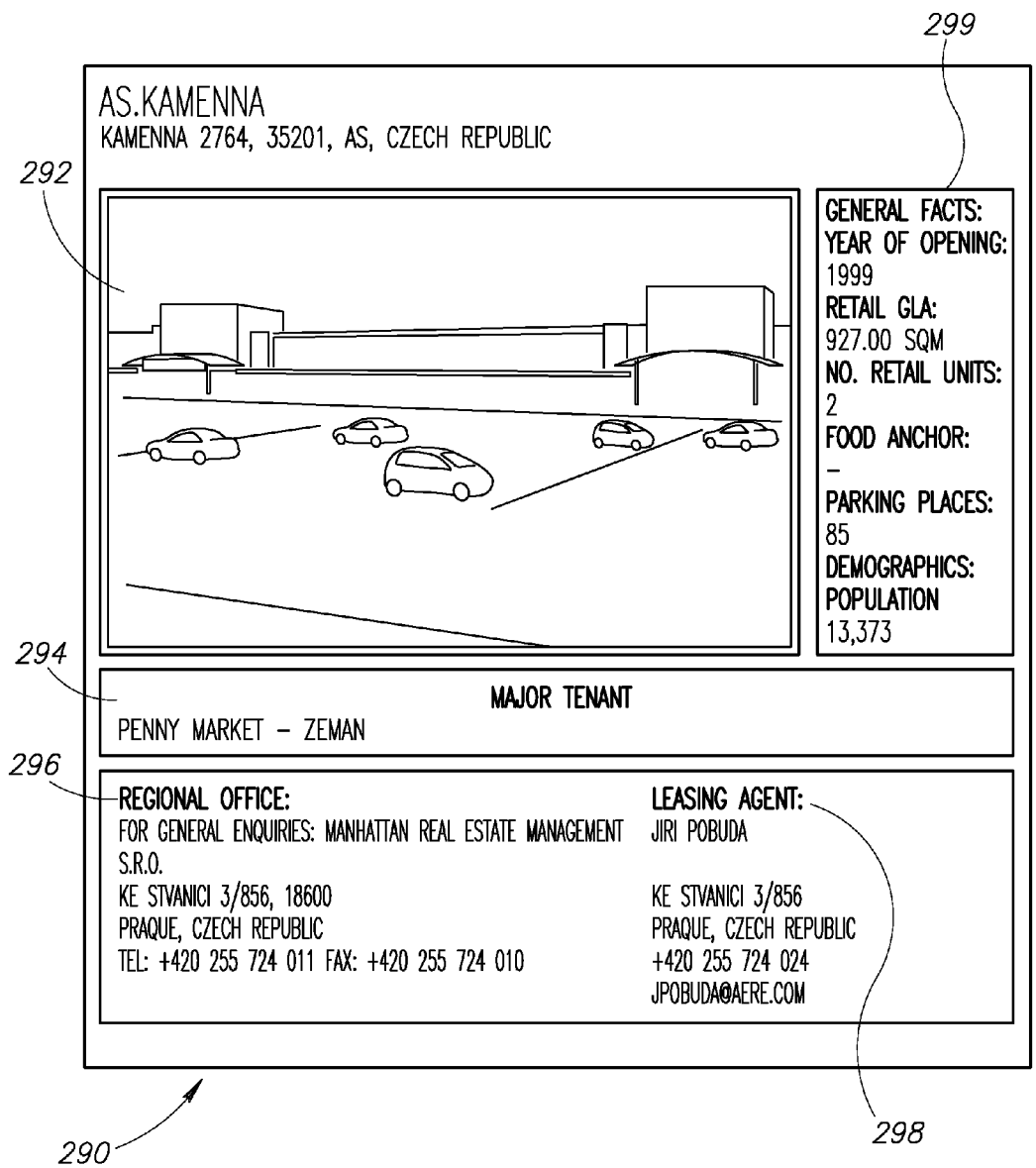
FIG. 26 is a diagram illustrating an example property information screen of an example portfolio management system.

The application also provides to the user a more detailed property information screen such as the example shown in FIG. 26. This screen is displayed by clicking on a property button in one or more locations in the application. When the button is clicked, the screen, generally referenced 290, comprises an image of the selected property 292, general facts of the property 299, the major tenant 294, regional office information 296 and leasing agent information 298. As shown, this shows detailed information about the selected property, including the property name, address, city, country, postal code, etc. In addition, other information includes the property image, which was entered as "property info" in the admin tools application. On the right hand side of the screen, the application displays statistical information 299 about the property.

In addition to the statistical information the application also displays the Major tenants 294 related to the property. Complementing the property information, the leasing agent 296 and the regional office 298 are displayed as well. This information provides the user with telephone and addresses data from both contacts to facilitate communications with them. At the bottom portion of the screen (not shown) the application optionally displays all the files of the type "property info" that have been previously entered into the application for the property via the admin tools. The example property screen shown in FIG. 26 does not have any associated files and would display the message "No Files". If the property did in fact have related files, the application displays the file names and buttons for a user to click. Clicking on a button opens the corresponding file so they can be viewed by the user. To return to the previous screen the user presses the "Back" button.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A real estate property portfolio management system, comprising:
    a central database operative to store real estate portfolio related data therein, said real estate portfolio related data including user, property, feature and financial information related to properties in said portfolio;
    a server computer in communication with a plurality of requesting devices including one or more client computers and one or more mobile devices over a network, said server computer incorporating a web-based interface and operative to access said central database in response to search requests for real estate portfolio related data received from requesting devices, over the network, retrieve said real estate portfolio related data from said central database and serve said retrieved real estate portfolio data to said corresponding requesting devices;
    a content management interface for providing content management users access to said central database via said one or more client computers with authority to access, modify, create, delete and otherwise manage portfolio property data stored in said central database including financial data, non-public data, broker data, location and demographic data, prospective data, leasing agent data, statistics data and tenant data;
    one or more mobile devices having a software application installed therein operative to provide internal users and public users dynamic access, interactive viewing and management of the real estate property portfolio, each mobile device having an internal user interface and a public user interface;
    a comparison module in said software application operative to compare one or more prospective properties to one or more non-prospective properties and display comparison results to an internal user;
    an offline database stored in each mobile device and operative to provide read only access to a snapshot of the entire contents of said central database when access to said central database is not available;
    said internal user interface for providing said internal users access to said s stem with authority to access and view property data including financial and other non-publicly available information in said central database or said offline database;
    said public user interface for providing said public users access to said system with authority to access and view only property data in said central database or offline database that is publically available; and
    wherein said real estate portfolio related data includes information related to currently owned real estate holdings as well as prospective properties not currently owned.

2. The system according to claim 1, wherein said central database resides in a data storage facility accessible over the Internet.

3. The system according to claim 1, wherein said central database is local to said server computer.

4. The system according to claim 1, further comprising one or more remotely located satellite databases operative to store property related data for real estate property portfolios other than those stored in said central database, wherein data in said one or more remotely located satellite databases is periodically synchronized with said central database, said synchronization performed only in one direction from the remote satellite database towards the central database.

5. The system according to claim 1, wherein said server computer is operative to receive data requests from a software security tool over said network.

6. The system according to claim 1, wherein said server computer is operative to receive data requests from a software administration tool over said network.

7. A method of managing a property portfolio, said method comprising:
    storing real estate portfolio related data in a central database, said real estate portfolio related data including user, property, tenant and financial related information;
    communicating on a server computer with a plurality of requesting devices including one or more client computers and one or more mobile devices over a network via a web-based interface;
    receiving search requests for real estate portfolio related data from requesting devices over said network;
    accessing said central database in response to said search requests for real estate portfolio related data and retrieving requested data therefrom, wherein when access to said central database is not available, a requesting device accessing an offline database stored therein which is operative to provide read only access to a snapshot of an entire contents of said central database;
    serving retrieved real estate portfolio data to the corresponding requesting devices over said network;
    communicating on a server computer with content management users via a content management interface for providing said content management users access to said central database via said one or more client computers with authority to access, modify, create, delete and otherwise manage portfolio property data stored in said central database, including financial data, non-public data, broker data, location and demographic data, prospective data, leasing agent data, statistics data and tenant data;
    communicating on a server computer with internal users via an internal user interface for providing said internal users access to said system via said one or more mobile devices with authority to access and view property data including financial and other non-publicly available information in said central database;
    communicating on a server computer with public users said public user interface for providing said public users access to said system via said one or more mobile devices with authority to access and view only property data in said central database that is publically available; and
    wherein said real estate portfolio related data includes information related to real estate holdings currently owned as well as not currently owned prospective properties.

8. The method according to claim 7, wherein said central database resides in a data storage facility accessible over the Internet.

9. The method according to claim 7, further comprising storing property related data for real estate property portfolios other than those stored in said central database in one or more remotely located satellite databases, wherein data in said one or more remotely located satellite databases is periodically synchronized with said central database, said synchronization performed only in one direction from the remote satellite database towards the central database.

10. A real estate property portfolio management system for use on a mobile device coupled to a network, comprising:
- a web-based interface to a remote central database coupled to the network, said remote central database operative to store real estate portfolio related data therein, said real estate portfolio related data including user, property, feature and financial information related to properties in said portfolio;
- a file interface to an offline database stored locally in said mobile device, said offline database containing a snapshot of the entire contents of said central database for read only access in the event said central database is not available;
- a user interface to receive search requests from internal users and public users for real estate portfolio property related data;
- search means for querying said central database with said search requests and to receive responses in response thereto over said web-based interface, and for querying said offline database with said search requests and to receive responses in response thereto over said file interface in the event said central database is not available;
- viewing means for presenting data contained in said responses to the requesting internal user or public user via said user interface;
- said user interface including an internal user interface for providing internal users access to real estate portfolio related data with authority to access and view property data stored in said central database and said offline database including financial data, non-public data, broker data, location and demographic data, prospective data, leasing agent data, statistics data and tenant data;
- said user interface including a public user interface for providing public users access to real estate portfolio related data with authority to access and view only property data in said central database and said offline database that is publically available; and
- wherein said real estate portfolio related data includes information related to real estate holdings currently owned as well as prospective properties not currently owned.

11. The system according to claim 10, wherein said offline database is created when said system is installed on said mobile device.

12. The system according to claim 10, wherein said offline database is periodically updated with current data from said central database.

13. A method of managing a real estate property portfolio on a mobile device coupled to a network, said method comprising:
- providing a web-based interface to a remote central database coupled to the network and operative to store real estate portfolio related data therein said real estate portfolio related data including user, property, feature and financial information related to properties in said portfolio;
- providing a file interface to an offline database stored locally in said mobile device, said offline database containing a snapshot of the entire contents of said central database for read only access in the event said central database is not available;
- providing a user interface to receive search requests from internal users and public users for real estate portfolio property related data;
- querying said central database with said search requests and receiving responses in response thereto over said web-based interface;
- querying said offline database with said search requests and receiving responses in response thereto over said file interface in the event said central database is not available;
- presenting data contained in said responses to the requesting internal user or public user via said user interface;
- wherein said user interface includes an internal user interface for providing internal users access to real estate portfolio related data with authority to access and view property data stored in said central database and said offline database including financial data, non-public data, broker data, location and demographic data, prospective data, leasing agent data, statistics data and tenant data;
- wherein said user interface includes a public user interface for providing public users access to real estate portfolio related data with authority to access and view only property data in said central database and said offline database that is publically available; and
- wherein said real estate portfolio related data includes information related to real estate holdings currently owned as well as prospective properties not currently owned.

14. The method according to claim 13, wherein said central database resides in a data storage facility accessible over the Internet.

15. The method according to claim 13, wherein said offline database is created when said system is installed on said mobile device.

16. The method according to claim 13, wherein said offline database is periodically updated with current data from said central database.

17. A non-transitory software application product that when executed on a processor in a mobile device is operative to:
- provide dynamic, interactive viewing and management of digital real estate property portfolio, said digital real estate property portfolio generated from property related data entered by one or more content management users and stored in a central database at a remote location and accessible over a network, said real estate property related data including user, property feature and financial information related to properties in said portfolio;
- provide a web-based interface to the remote central database coupled over the network;
- provide a file interface to an offline database stored locally in said mobile device, said offline database containing a snapshot of the entire contents of said central database for read only access in the event said central database is not available;

provide a user interface to receive search requests from internal users and public users for real estate portfolio property related data;

query said central database with said search requests and receive responses in response thereto over said web-based interface;

query said offline database with said search requests and receive responses in response thereto over said file interface in the event said central database is not available;

present data contained in said responses to the requesting internal user or public user via said user interface;

wherein said user interface includes an internal user interface for providing internal users access to real estate portfolio related data with authority to access and view property data stored in said central database and said offline database including financial data, non-public data, broker data, location and demographic data, prospective data, leasing agent data, statistics data and tenant data;

wherein said user interface includes a public user interface for providing public users access to real estate portfolio related data with authority to access and view only property data in said central database and said offline database that is publically available; and wherein said real estate portfolio related data includes information related to real estate holdings currently owned as well as prospective properties not currently owned.

18. The non-transitory software application product according to claim 17, wherein said central database resides in a data storage facility accessible over the Internet.

19. The non-transitory software application product according to claim 17, wherein said offline database is created when said system is installed on said mobile device.

20. The non-transitory software application product according to claim 17, wherein security related data in said central database is entered and maintained by a software security tool in communication with said database.

21. The non-transitory software application product according to claim 17, wherein portfolio administration related data in said central database is entered and maintained by a software administration tool in communication with said central database.

22. A computer program product for viewing a digital real estate property portfolio, the computer program product comprising:

a non-transitory, tangible computer usable storage medium having computer usable code embodied therewith, the computer usable program code comprising:

computer usable code configured for storing real estate portfolio related data in a central database, said real estate portfolio related data including user, property, tenant and financial related information;

computer usable code configured for communicating on a server computer with a plurality of requesting devices including one or more client computers and one or more mobile devices over a network via a web-based interface;

computer usable code configured for receiving search requests for real estate portfolio related data from requesting devices over said network;

computer usable code configured for accessing said central database in response to said search requests for real estate portfolio related data and retrieving requested data therefrom, wherein when access to said central database is not available, a requesting device accesses an offline database stored therein which is operative to provide read only access to a snapshot of an entire contents of said central database;

computer usable code configured for serving retrieved real estate portfolio data to the corresponding requesting devices over said network;

computer usable code configured for communicating on a server computer with content management users via a content management interface for providing said content management users access to said central database via said one or more client computers with authority to access, modify, create, delete and otherwise manage portfolio property data stored in said central database including financial data, non-public data, broker data, location and demographic data, prospective data, leasing agent data, statistics data and tenant data;

computer usable code configured for communicating on a server computer with internal users via an internal user interface for providing said internal users access to said system via said one or more mobile devices with authority to access and view property data including financial and other non-publicly available information in said central database;

computer usable code configured for communicating on a server computer with public users said public user interface for providing said public users access to said system via said one or more mobile devices with authority to access and view only property data in said central database that is publically available; and wherein said real estate portfolio related data includes information related to real estate holdings currently owned as well as prospective properties not currently owned.

23. The computer program product according to claim 22, wherein said central database resides in a data storage facility accessible over the Internet.

24. A mobile device coupled to a network, comprising:

a processor;

memory coupled to said processor;

one or more radios coupled to said processor, each radio operative to communicate over a wireless network;

a web-based interface to a remote central database in communication with the network and operative to store real estate portfolio related data therein, said real estate portfolio related data including user, property, feature and financial information related to properties in said portfolio;

a file interface to an offline database stored locally in said mobile device, said offline database containing a snapshot of the entire contents of said central database for read only access in the event said central database is not available;

a user interface to receive search requests from internal users and public users for real estate portfolio property related data;

search means for querying said central database with said search requests and to receive responses in response thereto over said web-based interface, and for querying said offline database with said search requests and to receive responses in response thereto over said file interface in the event said central database is not available;

viewing means for presenting data contained in said responses to the requesting internal user or public user via said user interface;

said user interface including an internal user interface for providing internal users access to real estate portfolio related data with authority to access and view property data stored in said central database and said offline database including financial data, non-public data, broker data, location and demographic data, prospective data, leasing agent data, statistics data and tenant data;

said user interface including a public user interface for providing public users access to real estate portfolio related data with authority to access and view only property data in said central database and said offline database that is publically available; and wherein said real estate portfolio related data includes information related to real estate holdings currently owned as well as prospective properties not currently owned.

25. The mobile device according to claim 24, wherein said central database resides in a data storage facility accessible over the Internet.

26. The mobile device according to claim 24, wherein said offline database is created when said system is installed on said mobile device.

27. The mobile device according to claim 24, wherein said offline database is periodically updated with current data from said central database.

* * * * *